US012130483B2

(12) United States Patent
Yao et al.

(10) Patent No.: US 12,130,483 B2
(45) Date of Patent: Oct. 29, 2024

(54) OPTICAL MODULE

(71) Applicant: HISENSE BROADBAND MULTIMEDIA TECHNOLOGIES CO., LTD., Shandong (CN)

(72) Inventors: Jianwei Yao, Shandong (CN); Benzheng Dong, Shandong (CN); Fabu Xu, Shandong (CN); Dongmei Yu, Shandong (CN); Fei Liu, Shandong (CN); Congwen Luo, Shandong (CN); Jianwei Mu, Shandong (CN)

(73) Assignee: HISENSE BROADBAND MULTIMEDIA TECHNOLOGIES CO., LTD., Shandong (CN)

( * ) Notice: Subject to any disclaimer, the term of this patent is extended or adjusted under 35 U.S.C. 154(b) by 288 days.

(21) Appl. No.: 17/707,879

(22) Filed: Mar. 29, 2022

(65) Prior Publication Data

US 2022/0221667 A1 Jul. 14, 2022

Related U.S. Application Data

(63) Continuation of application No. PCT/CN2020/114569, filed on Sep. 10, 2020.

(30) Foreign Application Priority Data

Jan. 8, 2020 (CN) .......................... 202010018782.7
Jan. 8, 2020 (CN) .......................... 202010018784.6

(51) Int. Cl.
 *G02B 6/42* (2006.01)
(52) U.S. Cl.
 CPC ......... *G02B 6/4268* (2013.01); *G02B 6/4206* (2013.01); *G02B 6/4246* (2013.01);
 (Continued)

(58) Field of Classification Search
 CPC ... G02B 6/4266; G02B 6/4267; G02B 6/4268
 See application file for complete search history.

(56) References Cited

U.S. PATENT DOCUMENTS 7,229,221 B2 6/2007 Ahrens
8,330,051 B2 12/2012 Huang et al.
(Continued)

FOREIGN PATENT DOCUMENTS

CN 1901421 A 1/2007
CN 101686611 A 3/2010
(Continued)

OTHER PUBLICATIONS

First Chinese Office Action regarding Application No. 202010018782.7 dated Feb. 23, 2021. English translation provided by Chinable IP.
(Continued)

*Primary Examiner* — Balram T Parbadia
*Assistant Examiner* — Kirsten D. Endresen
(74) *Attorney, Agent, or Firm* — Harness, Dickey & Pierce, P.L.C.

(57) ABSTRACT

This application discloses an optical module. A circuit board is provided with a first heat dissipation member. One end of the first heat dissipation member is attached with an optical chip, with a lens assembly covering the optical chip. The other end extends outwardly from a coverage region of the lens assembly, so that heat generated by the optical chip is diffused to outside of the lens assembly. One end of the first heat dissipation member away from the lens assembly is provided with a second heat dissipation member whose upper surface being provided with a thermally conductive member. An upper surface of the thermally conductive member is thermally coupled with an upper enclosure. The second heat dissipation member conducts the heat diffused by the first heat dissipation member to the upper enclosure
(Continued)

via the thermally conductive member. Thus, heat dissipation is achieved via the upper enclosure.

16 Claims, 11 Drawing Sheets

(52) U.S. Cl.
CPC ........... *G02B 6/4269* (2013.01); *G02B 6/428* (2013.01); *G02B 6/4204* (2013.01)

(56) References Cited

U.S. PATENT DOCUMENTS

| | | |
|---|---|---|
| 8,509,622 B2 | 8/2013 | Zhong |
| 9,190,808 B1 | 11/2015 | Lin et al. |
| 9,645,334 B2 | 5/2017 | Ishii et al. |
| 10,517,166 B2 | 12/2019 | Matsui |
| 2006/0285806 A1 | 12/2006 | Ahrens |
| 2010/0200277 A1* | 8/2010 | Huang ................ H05K 1/0204 29/829 |
| 2011/0293284 A1 | 12/2011 | Zhong |
| 2016/0246019 A1 | 8/2016 | Ishii et al. |
| 2018/0156972 A1* | 6/2018 | Kainuma ............... H05K 1/183 |
| 2018/0172930 A1 | 6/2018 | Kanda et al. |
| 2019/0281691 A1 | 9/2019 | Matsui |

FOREIGN PATENT DOCUMENTS

| | | | | |
|---|---|---|---|---|
| CN | 101872042 A | | 10/2010 | |
| CN | 102612302 A | | 7/2012 | |
| CN | 104930378 A | | 9/2015 | |
| CN | 204666874 U | | 9/2015 | |
| CN | 105319656 A | | 2/2016 | |
| CN | 205301638 U | | 6/2016 | |
| CN | 105911652 A | | 8/2016 | |
| CN | 106443913 A | | 2/2017 | |
| CN | 106597604 A | | 4/2017 | |
| CN | 107121737 A | | 9/2017 | |
| CN | 107436466 A | | 12/2017 | |
| CN | 207249194 U | * | 4/2018 | ........... G02B 6/4246 |
| CN | 109031548 A | | 12/2018 | |
| CN | 109031550 A | | 12/2018 | |
| CN | 109699115 A | * | 4/2019 | ........... H05K 1/0203 |
| CN | 208780860 U | | 4/2019 | |
| CN | 109856738 A | | 6/2019 | |
| CN | 110231687 A | | 9/2019 | |
| CN | 110459512 A | | 11/2019 | |
| CN | 209879078 U | | 12/2019 | |
| CN | 111061022 A | | 4/2020 | |
| DE | 10065034 B4 | * | 1/2006 | ........... G02B 6/4201 |
| EP | 3470899 A1 | | 4/2019 | |

OTHER PUBLICATIONS

First Chinese Office Action regarding Application No. 202010018784.6 dated Oct. 28, 2021. English translation provided by Chinable IP.

* cited by examiner

OPTICAL MODULE

CROSS-REFERENCE TO RELATED APPLICATIONS

This application is a continuation application of PCT/CN2020/114569, filed Sep. 10, 2020, and claims priority to Application No. 202010018782.7 filed with the China National Intellectual Property Administration on Jan. 8, 2020, and also claims priority to Application No. 202010018784.6, filed with the China National Intellectual Property Administration on Jan. 8, 2020, all of which are incorporated herein by reference in their entireties.

This application claims the priority to the Application No. 202010018782.7, filed with the China National Intellectual Property Administration on Jan. 8, 2020, and the priority to the Application No. 202010018784.6, filed with the China National Intellectual Property Administration on Jan. 8, 2020, which are incorporated herein by references in their entirety.

FIELD OF THE INVENTION

This application relates to the field of optical communication technologies, and in particular, to an optical module.

BACKGROUND OF THE INVENTION

An optical module includes a printed circuit board (PCB for short), a laser disposed on the printed circuit board, a detector, driving chips for driving the laser and the detector, and other components. The components are soldered on corresponding pads of the printed circuit board. Each component may generate heat during operation. If the heat cannot be dissipated quickly, an environment temperature of the optical module may keep rising, which may deteriorate the performance of the optical module.

SUMMARY OF THE INVENTION

According to an aspect, the present disclosure provides an optical module, comprising: an upper enclosure; a lower enclosure; a circuit board disposed in a chamber enclosed by the upper enclosure and the lower enclosure; an optical chip electrically coupled to the circuit board and configured to transmit and/or receive an optical signal; a lens assembly mounted on the circuit board, wherein the lens assembly covers the optical chip and is configured to propagate a light beam; a heat dissipation structure comprising: a first heat dissipation member provided on the circuit board, wherein a portion of the first heat dissipation member is located below the lens assembly, and the other portion is located outside of the lens assembly; wherein the optical chip is attached at one end of the first heat dissipation member, and the first heat dissipation member is configured to conduct heat generated by the optical chip to outside of a coverage region of the lens assembly; a second heat dissipation member attached on the first heat dissipation member, wherein the second heat dissipation member is provided outside of the lens assembly, and is configured to receive and diffuse heat conducted by the first heat dissipation member; a third heat dissipation member embedded in intermediate layers of the circuit board, wherein a portion of the third heat dissipation member is located below the lens assembly, and the other portion is located outside of the lens assembly; and a through hole provided between the first heat dissipation member and the third heat dissipation member, penetrating a multilayer plate in the circuit board, filled with a thermally conductive material, and configured to perform heat conduction between the first heat dissipation member and the third heat dissipation member; and a thermally conductive member disposed on an upper surface of the second heat dissipation member and configured to receive heat conducted by the second heat dissipation member, wherein one end of the thermally conductive member is thermally coupled to the upper enclosure for conducting the heat to the upper enclosure.

According to another aspect, the present disclosure provides an optical module, comprising: an upper enclosure; a lower enclosure; a circuit board disposed in a chamber enclosed by the upper enclosure and the lower enclosure; an optical chip electrically coupled to the circuit board and configured to transmit and/or receive an optical signal; a lens assembly mounted on the circuit board, wherein the lens assembly covers the optical chip and is configured to propagate a light beam; a heat dissipation structure comprising: a first heat dissipation member provided on the circuit board, wherein a portion of the first heat dissipation member is located below the lens assembly, and the other portion is located outside of the lens assembly; wherein the optical chip is attached at one end of the first heat dissipation member, and the first heat dissipation member is configured to conduct heat generated by the optical chip to outside of a coverage region of the lens assembly; a third heat dissipation member embedded in intermediate layers of the circuit board, wherein a portion of the third heat dissipation member is located below the lens assembly, and the other portion is located outside of the lens assembly; a second heat dissipation member attached on the circuit board, wherein the second heat dissipation member is provided outside of the lens assembly, opposite to the portion of the third heat dissipation member that is located outside of the lens assembly, and configured to receive and diffuse heat conducted by the third heat dissipation member; and through holes provided between the first heat dissipation member and the third heat dissipation member and between the second heat dissipation member and the third heat dissipation member, penetrating a multilayer plate in the circuit board, filled with a thermally conductive material, and configured to perform heat conduction between the first heat dissipation member and the third heat dissipation member and between the second heat dissipation member and the third heat dissipation member; and a thermally conductive member disposed on an upper surface of the second heat dissipation member and configured to receive heat conducted by the second heat dissipation member, wherein one end of the thermally conductive member is thermally coupled to the upper enclosure for conducting the heat to the upper enclosure.

According to still another aspect, the present disclosure provides an optical module, comprising: an upper enclosure; a lower enclosure; a circuit board disposed in a chamber enclosed by the upper enclosure and the lower enclosure; an optical chip electrically coupled to the circuit board and configured to transmit and/or receive an optical signal; a lens assembly mounted on the circuit board, wherein the lens assembly covers the optical chip and is configured to propagate a light beam; a heat dissipation structure comprising: a first heat dissipation member provided on the circuit board, wherein a portion of the first heat dissipation member is located below the lens assembly, and the other portion is located outside of the lens assembly; wherein the optical chip is attached at one end of the first heat dissipation member, and the first heat dissipation member is configured to conduct heat generated by the optical chip to outside of a coverage region of the lens assembly; and a second heat dissipation member attached on the first heat dissipation member, wherein the second heat dissipation member is provided outside of the lens assembly, and is configured to receive and diffuse heat conducted by the first heat dissipation member; and a thermally conductive member disposed on an upper surface of the second heat dissipation member and configured to receive heat conducted by the second heat dissipation member, wherein one end of the thermally conductive member is thermally coupled to the upper enclosure for conducting the heat to the upper enclosure.

BRIEF DESCRIPTION OF THE DRAWINGS

To more clearly describe the technical solutions of the present disclosure, the accompanying drawings to be used in the embodiments will be described briefly below. Apparently, other accompanying drawings may also be derived, without an inventive effort, by one of ordinary skills in the art from these accompanying drawings.

DETAILED DESCRIPTION OF THE EMBODIMENTS

Figure 1:
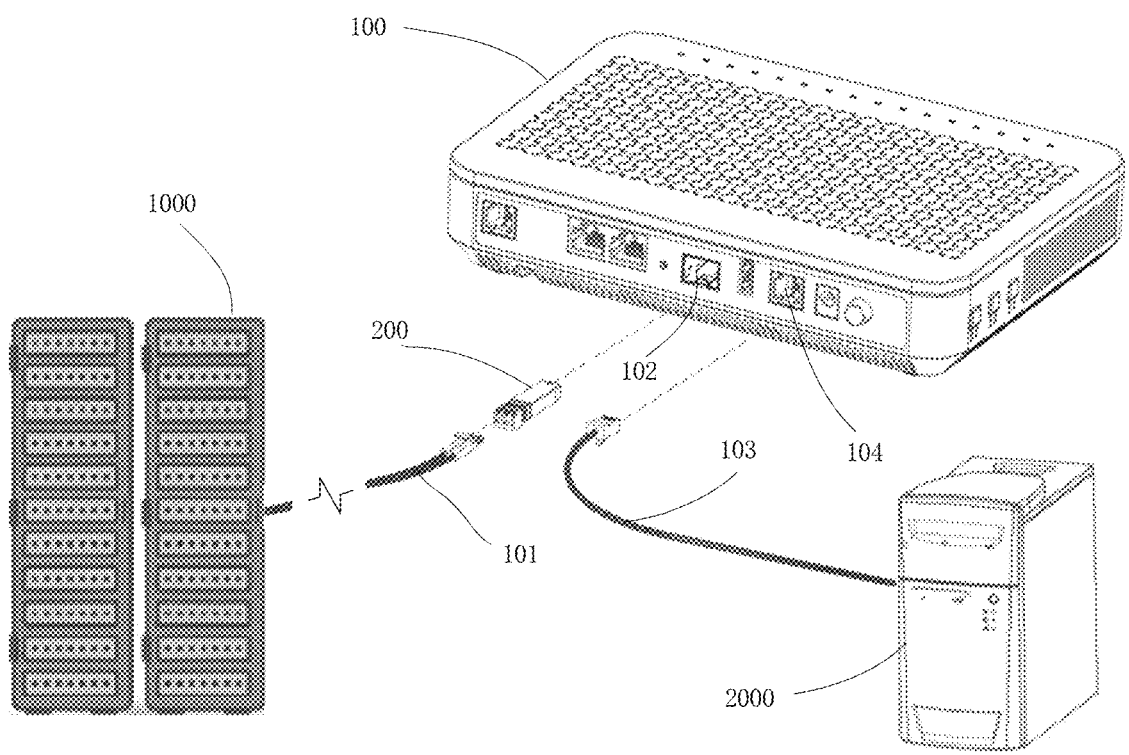
FIG. 1 is a schematic diagram illustrating a connection relationship of an optical communication terminal.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to". In the description of the specification, the terms such as "one embodiment", "some embodiments", "exemplary embodiments", "example", "specific example" or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms "first" and "second" are used for descriptive purposes only, and are not to be construed as indicating or implying the relative importance or implicitly indicating the number of indicated technical features. Thus, features defined with "first" and "second" may explicitly or implicitly include one or more of the features. In the description of the embodiments of the present disclosure, the term "a/the plurality of" means two or more unless otherwise specified.

In the description of some embodiments, the term "coupled" and "connected" and their derivatives may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The use of the phrase "applicable to" or "configured to" herein means an open and inclusive language, which does not exclude devices that are applicable to or configured to perform additional tasks or steps.

As used herein, the term "about", "substantially" or "approximately" includes a stated value and an average value within an acceptable range of deviation of a particular value. The acceptable range of deviation is determined by a person of ordinary skill in the art, considering measurement in question and errors associated with measurement of a particular quantity (i.e., limitations of a measurement system).

In optical communication technology, an optical signal is used to carry information to be transmitted, and the optical signal carrying the information is transmitted to an information processing device such as a computer through an information transmission device such as an optical fiber or an optical waveguide, so as to achieve transmission of the information. Since light has a characteristic of passive transmission when being transmitted through the optical fiber or the optical waveguide, low-cost and low-loss information transmission may be achieved. In addition, a signal transmitted by the information transmission device such as the optical fiber or the optical waveguide is the optical signal, while a signal that may be recognized and processed by the information processing device such as the computer is an electrical signal. Therefore, in order to establish information connection between the information transmission device such as the optical fiber or the optical waveguide and the information processing device such as the computer, interconversion between the electrical signal and the optical signal needs to be achieved.

An optical module implements a function of the interconversion between the optical signal and the electrical signal in the field of optical fiber communication technology. The optical module includes an optical port and an electrical port. The optical module achieves optical communication with the information transmission device such as the optical fiber or the optical waveguide through the optical port. And the optical module achieves electrical connection with an optical network terminal (e.g., an optical modem) through the electrical port. The electrical connection is mainly to achieve power supply, transmission of an I2C signal, transmission of data information and grounding. The optical network terminal transmits the electrical signal to the information processing device such as the computer through a network cable or wireless fidelity (Wi-Fi).

Embodiment 1

FIG. 1 shows a schematic diagram illustrating a connection relationship of an optical communication terminal. As shown in FIG. 1, the optical communication system includes a remote server 1000, a local information processing device 2000, an optical network terminal 100, an optical module 200, an optical fiber 101 and a network cable 103.

One end of the optical fiber 101 is connected to the remote server 1000, and the other end thereof is connected to the optical network terminal 100 through the optical module 200. The optical fiber itself may support long-distance signal transmission, such as several-kilometer (6-kilometer to 8-kilometer) signal transmission. On this basis, infinite-distance transmission may be achieved theoretically if a repeater is used. Therefore, in a typical optical communication system, a distance between the remote server 1000 and the optical network terminal 100 may typically reach several kilometers, tens of kilometers, or hundreds of kilometers.

One end of the network cable 103 is connected to the local information processing device 2000, and the other end thereof is connected to the optical network terminal 100. The local information processing device 2000 is at least one of the followings: a router, a switch, a computer, a mobile phone, a tablet computer or a television.

A physical distance between the remote server 1000 and the optical network terminal 100 is greater than a physical distance between the local information processing device 2000 and the optical network terminal 100. Connection between the local information processing device 2000 and the remote server 1000 is completely by the optical fiber 101 and the network cable 103, and connection between the optical fiber 101 and the network cable 103 is completely by the optical module 200 and the optical network terminal 100.

The optical module 200 includes an optical port and an electrical port. The optical port is configured to access the optical fiber 101, so that a bidirectional optical signal connection is established between the optical module 200 and the optical fiber 101; and the electrical port is configured to access the optical network terminal 100, so that a bidirectional electrical signal connection is established between the optical module 200 and the optical network terminal 100. Interconversion between the optical signal and the electrical signal is achieved by the optical module 200, so that information connection between the optical fiber 101 and the optical network terminal 100 is established. For example, an optical signal from the optical fiber 101 is converted into an electrical signal by the optical module 200 and then the electrical signal is input into the optical network terminal 100, and an electrical signal from the optical network terminal 100 is converted into an optical signal by the optical module 200 and then the optical signal is input into the optical fiber 101. Since the optical module 200 is a tool for achieving the interconversion between the optical signal and the electrical signal, and has no function of processing data, the information does not change in the above photoelectric conversion process.

The optical network terminal 100 includes a housing in a substantially cuboid shape, and an optical module interface 102 and a network cable interface 104 that are disposed on the housing. The optical module interface 102 is configured to access the optical module 200, so that the bidirectional electrical signal connection between the optical network terminal 100 and the optical module 200 is established; and the network cable interface 104 is configured to access the network cable 103, so that a bidirectional electrical signal connection between the optical network terminal 100 and the network cable 103 is established. Connection between the optical module 200 and the network cable 103 is established through the optical network terminal 100. For example, the optical network terminal 100 transmits an electrical signal from the optical module 200 to the network cable 103, and transmits an electrical signal from the network cable 103 to the optical module 200. Therefore, the optical network terminal 100, as a master monitor of the optical module 200, may monitor operation of the optical module 200. In addition to the optical network terminal 100, the master monitor of the optical module 200 may further include an optical line terminal (OLT).

A bidirectional signal transmission channel between the remote server 1000 and the local information processing device 2000 has been established through the optical fiber 101, the optical module 200, the optical network terminal 100 and the network cable 103.

Figure 2:
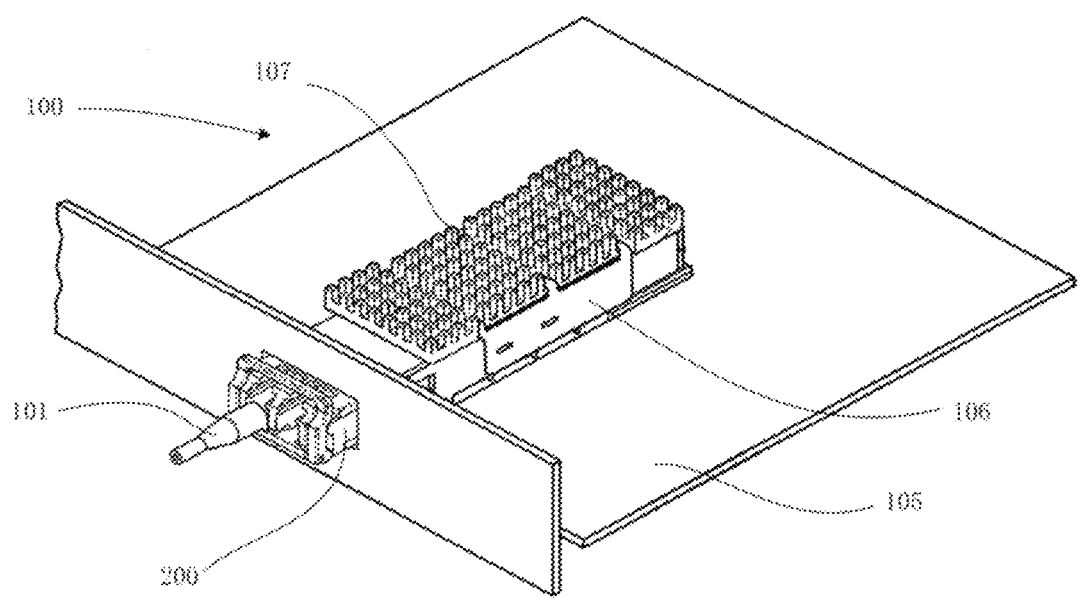
FIG. 2 is a schematic structural diagram of an optical network terminal.

FIG. 2 shows a schematic diagram of a component of an optical network terminal according to an embodiment of the present disclosure. As shown in FIG. 2, the optical network terminal 100 has a circuit board 105, and a cage 106 is arranged on a surface of the circuit board 105. Electrical connectors are provided within the cage 106 for connecting to an electrical port, such as a golden finger, of the optical module. A radiator 107 with protrusions such as fins for increasing a heat dissipation area is disposed on the cage 106.

The optical module 200 is inserted into the optical network terminal. Specifically, the electrical port of the optical module is inserted into the electrical connector within the cage 106, while the optical port of the optical module is connected to the optical fiber 101.

The cage 106 is arranged on the circuit board, with the electrical connector on the circuit board being enclosed in the cage, so that the cage is provided with an electrical connector disposed within. The optical module is inserted into the cage and is fixed by the cage. Heat generated by the optical module is conducted to the cage 106, and then is dissipated via the radiator 107 on the cage.

Figure 3:
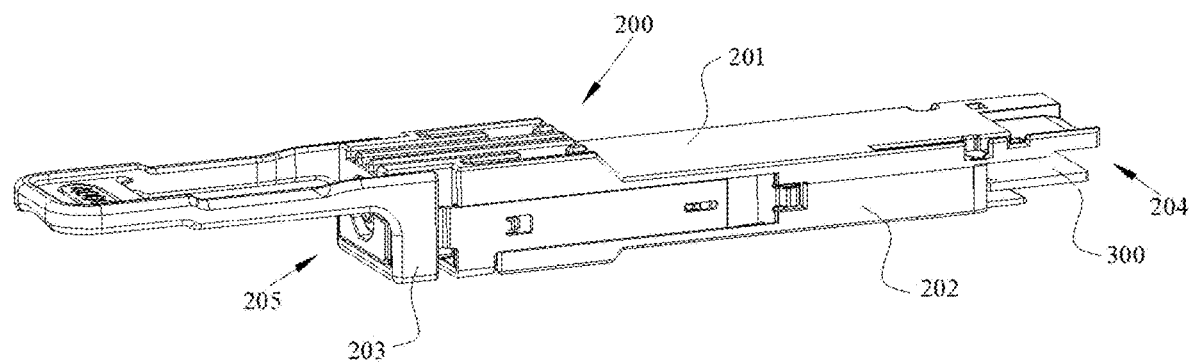
FIG. 3 is an overall schematic structural diagram of an optical module according to an embodiment of this application.
Figure 4:
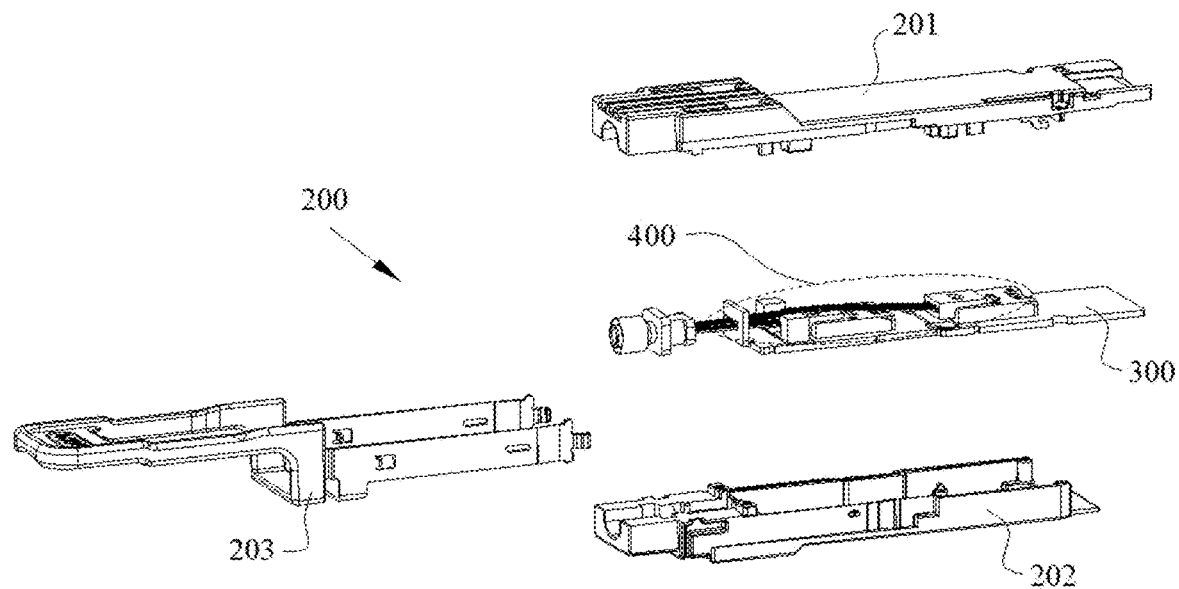
FIG. 4 is an exploded schematic structural diagram of an optical module according to an embodiment of this application.
Figure 5:
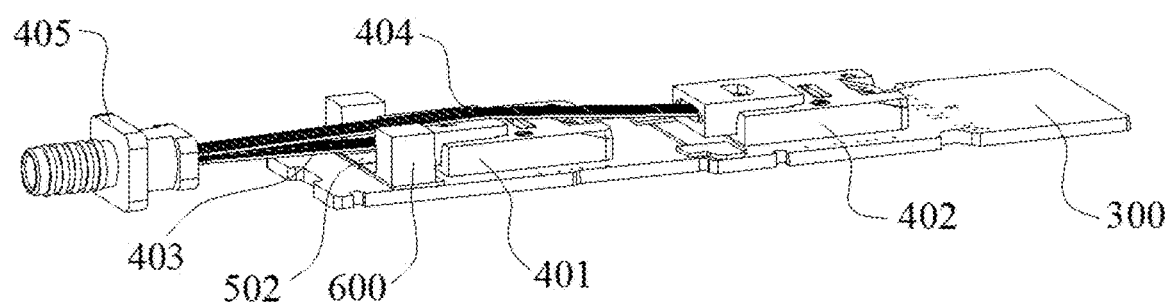
FIG. 5 is a schematic diagram of an inner structure of an optical module according to an embodiment of this application.
Figure 6:
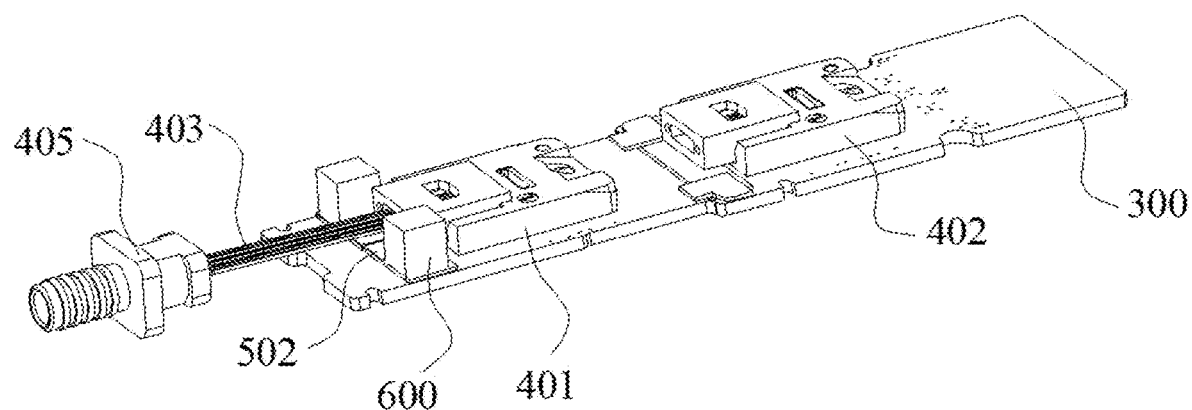
FIG. 6 is a schematic diagram of another inner structure of an optical module according to an embodiment of this application.
Figure 7:
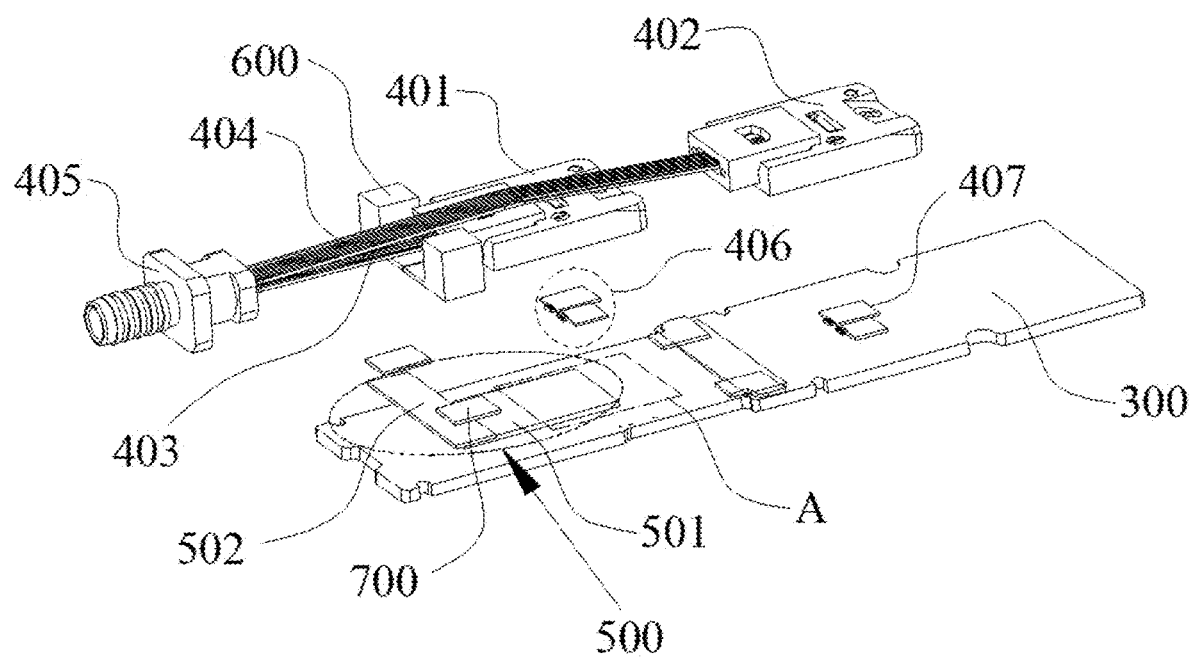
FIG. 7 is an exploded schematic diagram of an inner structure of an optical module according to an embodiment of this application.

FIG. 3 is an overall schematic structural diagram of an optical module according to an embodiment of this application. FIG. 4 is an exploded schematic structural diagram of an optical module according to an embodiment of this application. FIG. 5 is a schematic diagram of an inner structure of an optical module according to an embodiment of this application. FIG. 6 is a schematic diagram of another inner structure of an optical module according to an embodiment of this application. FIG. 7 is an exploded schematic diagram of an inner structure of an optical module according to an embodiment of this application. As shown in FIG. 3 to FIG. 7, an optical module 200 provided in the embodiments of this application includes an upper enclosure 201, a lower enclosure 202, an unlocking part 203, a circuit board 300, a lens assembly 401, an optical chip 406, a fiber ribbon 403, a heat dissipation structure 500, and a thermally conductive member 600.

The upper enclosure 201 is covered on the lower enclosure 202 to form a chamber with two openings, and an outer contour of the chamber is generally in a cuboid shape. In an embodiment of the present disclosure, the lower enclosure 202 includes a main plate and two side plates arranged at two sides of the main plate and perpendicular to the main plate; the upper enclosure 201 includes a cover plate, where the cover plate is covered on the two side plates of the lower enclosure to form the chamber; the upper enclosure 201 may further include two side walls located at two sides of the cover plate and disposed perpendicular to the cover plate. The two side walls cooperate with the two side plates such that the upper enclosure is covered on the lower enclosure 202.

The two openings of the chamber may be openings at two ends opening along the same direction, or may be two openings in different directions. Openings 204 and 205 in FIG. 3 are two openings in opposite directions, where the opening 204 is an electrical port, and golden fingers of the circuit board may extend outwardly from the electrical port 204 and be inserted into a host computer such as the optical network terminal. The other opening 205 forms an optical port, and is configured to allow accessing of an external fiber to connect an optical transceiver 400 within the optical module. The circuit board 300, the optical transceiver 400, and other optoelectronic devices are located in the chamber. The optical transceiver 400 includes the lens assembly 401, the optical chip 406, an optical interface 405, and the fiber ribbon 403.

The assembly mode in which the upper enclosure 201 cooperates with the lower enclosure 202 facilitates to arrange the circuit board 300, the optical transceiver 400, and other devices into the enclosure. The upper enclosure 201 and the lower enclosure 202 form an outermost packaging protective enclosure of the optical module. The upper enclosure 201 and the lower enclosure 202 are generally made of metal materials, which is conducive to electromagnetic shielding and heat dissipation. Generally, the enclosure of the optical module is not made into an integral part. Otherwise, it will be difficult to mount positioning parts and heat dissipation and electromagnetic shielding parts during assembling of the circuit board and other components, and production automation is not facilitated, either.

The unlocking part 203 is located at an outer wall of the lower enclosure 202 of the chamber, to realize a fixed connection between the optical module and the host computer or to release the fixed connection between the optical module and the host computer.

The unlocking part 203 has a clamping part that matches with the cage of the host computer, and the unlocking part may be allowed to move with respect to a surface of the outer wall by pulling a rear end of the unlocking part. The optical module in inserted into the cage of the host computer, and is fixed in the cage of the host computer by the clamping part of the unlocking part. By pulling the unlocking part, the clamping part of the unlocking part moves accordingly, so that a connection relationship between the clamping part and the host computer is changed, thereby releasing a clamping relationship between the optical module and the host computer. In this way, the optical module may be pulled out of the cage of the host computer.

The circuit board 300 is provided with a circuit cable, electronic elements (such as a capacitor, a resistor, a transistor, or an MOS tube), a chip (such as an MCU, a laser driver chip, a limiting amplification chip, a clock data recovery CDR chip, a power management chip, or a data processing chip DSP), and the like. The electrical components of the optical module are connected according to a circuit design via circuit tracings in the circuit board, so as to achieve electrical functions such as power supply, transmission of electrical signals and optical signals, and electrical grounding.

The circuit board 300 is generally a rigid circuit board. The rigid circuit board may further achieve a carrying function due to a relatively hard material thereof. For example, the rigid circuit board may carry a chip stably. When the optical transceiver 400 is mounted on the circuit board 300, stable carrying may also be provided by the rigid circuit board. The rigid circuit board may further be inserted into the electrical connector in the cage of the host computer. In an embodiment of the present disclosure, metal pins/gold fingers are formed on a surface of a rear end of the rigid circuit board, for connecting the electrical connector. These all cannot be conveniently implemented by a flexible circuit board.

In some optical modules, a flexible circuit board may also be used to serve as a supplement to the rigid circuit board. The flexible circuit board is generally used in cooperation with the rigid circuit board. For example, the rigid circuit board and the optical transceiver may be connected via a flexible circuit board.

To realize long-distance transmission and improve a transmission rate of optical communication, optical modules with 400 G have been used in this field to emit and receive light of different wavelengths. Specifically, the optical module may adopt an optical-to-electrical converter with characteristics of dual-fiber bidirectional optical signal transmission.

FIG. 6 is a schematic diagram of another inner structure of an optical module according to an embodiment of this application. To realize a dual-fiber bidirectional optical signal transmission, referring to FIG. 5 and FIG. 6, the optical transceiver 400 includes a lens assembly 401, a fiber ribbon 403, an optical interface 405, and an optical chip 406. The optical chip 406 includes a laser and a laser driving chip, or a detector and a detector driving chip, or any one of the laser, the laser driving chip, the detector, and the detector driving chip. The two driving chips both are electrically connected to a signal circuit of the circuit board 300. The laser driving chip drives the laser to generate an optical signal, and the optical signal is propagated to the fiber ribbon through the lens assembly. The detector driving chip drives the detector to receive the optical signal from the fiber ribbon.

To realize optical coupling of the optical module, the lens assembly 401 is covered on/caps the optical chip 406. The lens assembly 401 is configured to propagate a light beam, for example, to collimate and converge light. The lens assembly 401 is coupled to the optical interface 405 via the fiber ribbon 403. During an optical emission process, the optical signal emitted by the laser in the optical chip 406 is collimated and converged by the lens assembly 401, and then is emitted by the fiber ribbon 403. During an optical receiving process, an optical signal from the optical interface 405 is propagated into the fiber ribbon 403, and then is received by the detector in the optical chip 406.

To improve a transmission efficiency of the optical module, a plurality groups of optical transceivers may be further disposed in the optical module. In other words, one group of optical transceivers, two groups of optical transceivers, or three groups of optical transceivers may be included. The way to set plurality groups of optical transceivers may be same or similar to that for one group of optical transceivers. Taking setting two groups of optical transceivers as an example. A first group of optical transceivers includes a first lens assembly 401, a first fiber ribbon 403, and a first optical chip 406, and a second group of optical transceivers includes a second lens assembly 402, a second fiber ribbon 404, and a second optical chip 407, as shown in FIG. 5 and FIG. 6. In some embodiments of this application, the second optical chip 407 is electrically connected to a signal circuit of the circuit board 300, for receiving and emitting the optical signal. The second lens assembly 402 is connected to the optical interface 405 through the second fiber ribbon 404. During an optical emission process, an optical signal emitted by the second optical chip 407 is emitted by the second fiber ribbon 404 after being collimated and converged by the second lens assembly 402. During an optical receiving process, the optical signal generated by the optical interface 405 is propagated into the second fiber ribbon 404, and then is received by the second optical chip 407. When a plurality groups of optical transceivers are disposed, the optical chip in each group of optical transceivers may be provided with a detector, a detector driving chip, a laser driving chip, and a laser; or may be merely provided with a detector and a detector driving chip; or may be merely provided with a laser driving chip and a laser. This is determined according to actual application, and is not specifically defined in this embodiment.

Components such as lasers in an optical chip may generate heat during operation. If the heat cannot be dissipated quickly, an environment temperature thereof may keep rising, which may deteriorate the performance of the optical module. Thermal conductivity of an optical module is poor because both the two optical chips are covered by the lens assembly, and an outer housing of the lens assembly is made of a plastic material. To this end, to dissipate heat for the optical module and improve heat dissipation effect, a heat dissipation structure 500 and a thermally conductive member 600 are used in embodiments of this application, to conduct the heat generated by the optical chip to the upper enclosure 201 through a surface of the circuit board 300. The upper enclosure 201 may receive the heat conducted by the thermally conductive member 600 and dissipate the same to a surrounding environment.

In the optical module provided in the embodiments of this application, when plurality groups of optical transceivers are disposed, heat dissipation mechanism of the plurality groups of optical transceivers is the same as the heat dissipation principle of one group of transceivers, and details are not repeatedly described herein. Moreover, description is made by only taking heat dissipation of the laser as an example. Meanwhile, for a solution for heat dissipation of the detector, and solutions for heat dissipation of the laser, the laser driving chip, the detector, and the detector driving chip, reference may be made to the solution for the heat dissipation of the laser, and details are not repeatedly described herein.

Figure 8:
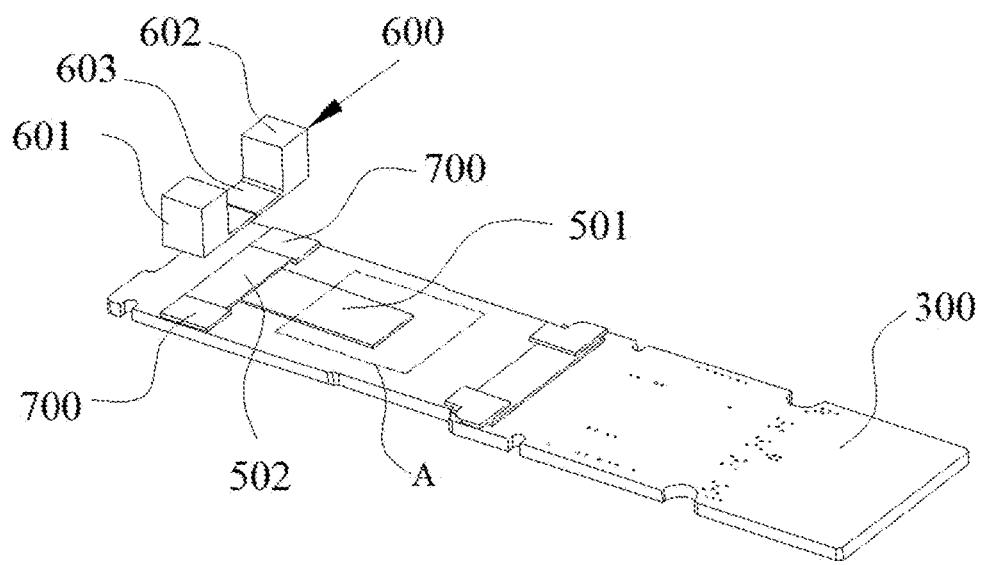
FIG. 8 is an exploded schematic structural diagram of a heat dissipation structure according to an embodiment of this application.
Figure 9:
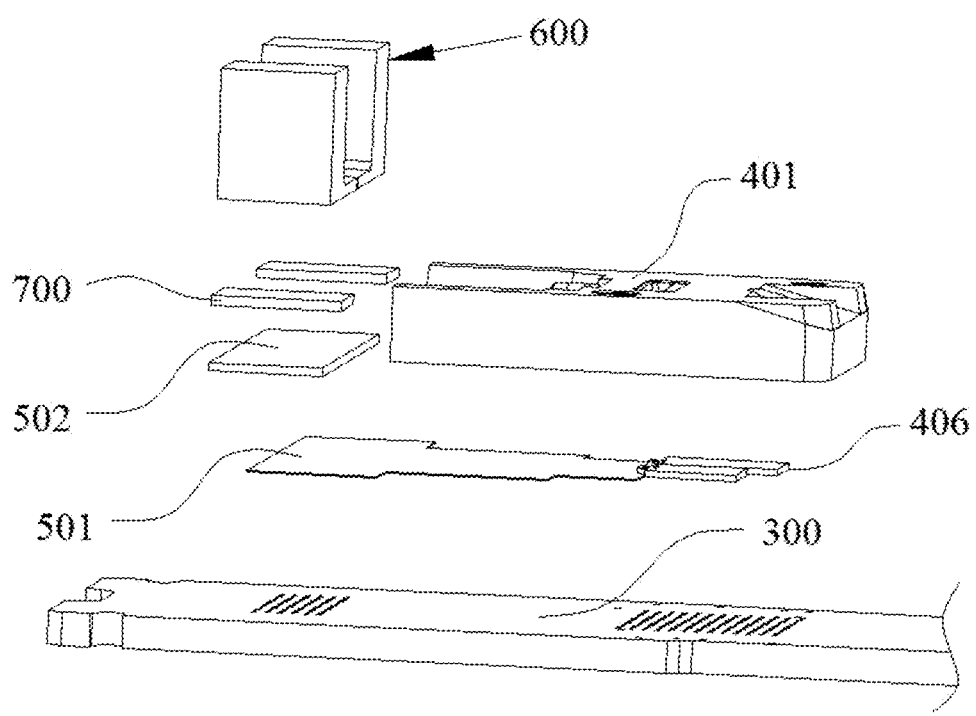
FIG. 9 is a partial exploded schematic structural diagram of a heat dissipation structure according to an embodiment of this application.
Figure 10A:
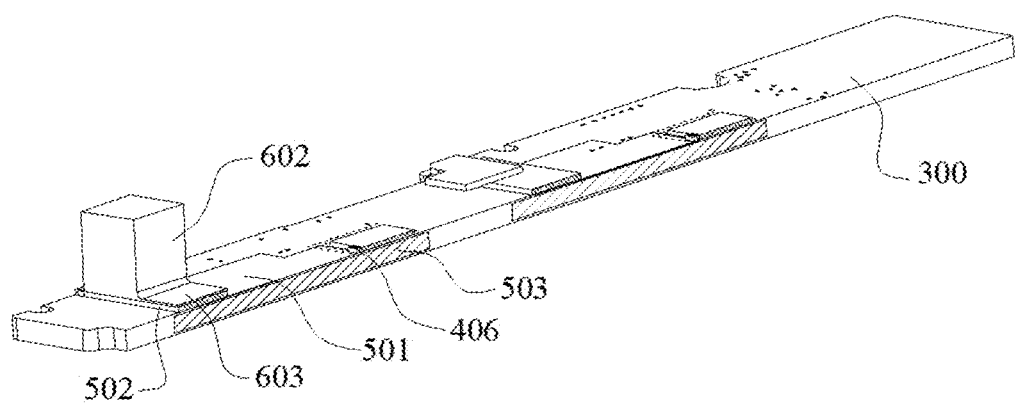
FIG. 10A is a sectional view of a circuit board according to an embodiment of this application.
Figure 10B:
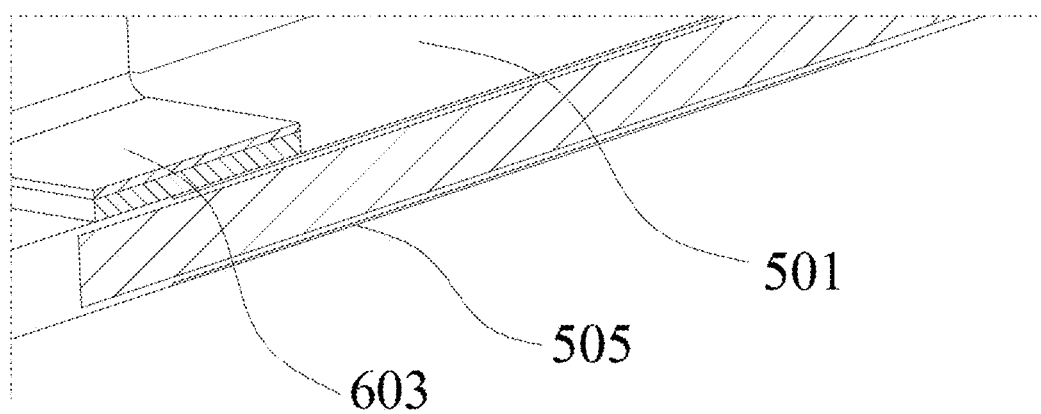
FIG. 10B is a partial-sectional view of the circuit board of FIG. 10A.
Figure 10C:
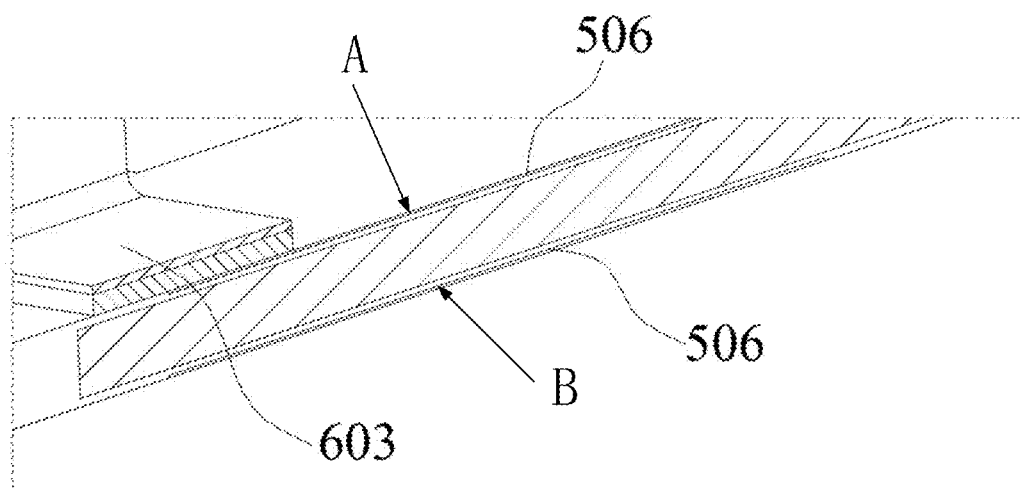
FIG. 10C is another partial sectional view of the circuit board of FIGS. 10A and 10B.

FIG. 7 is an exploded schematic diagram of an inner structure of an optical module according to an embodiment of this application. FIG. 8 is an exploded schematic structural diagram of a heat dissipation structure according to an embodiment of this application. FIG. 9 is a partial exploded schematic structural diagram of a heat dissipation structure according to an embodiment of this application. FIG. 10A, FIG. 10B and FIG. 10C are sectional views of a circuit board according to an embodiment of this application. Referring to FIG. 7, FIG. 8, FIG. 9, and FIGS. 10A-C, the heat dissipation structure 500 provided in the embodiments of this application include a first heat dissipation member 501, a second heat dissipation member 502, and a third heat dissipation member 503.

To make one end of the first heat dissipation member 501 may be extended outside of coverage region of the lens assembly 401, and enable the heat generated by the optical chip covered by the lens assembly 401 to be diffused towards outside of the coverage region of the lens assembly 401, the first heat dissipation member 501 is disposed on the circuit board 300. The first heat dissipation member 501 may be attached on the surface of the circuit board 300 along a length direction of the circuit board 300, or may be disposed within the circuit board 300. The first heat dissipation member 501 is configured to diffuse, along the circuit board 300, the heat generated by the optical chip 406 to outside of the coverage region of the lens assembly 401, that is, diffuse, along the circuit board 300, the heat generated by the laser to outside of the coverage region of the lens assembly 401. The dissipation member 501 may be made of a material with thermal conductivity, for example, may be a copper layer or a copper block; or may be made of another material. This is not specifically defined in the embodiments.

The first heat dissipation member 501 is attached on the surface of the circuit board 300. When the first heat dissipation member 501 is a copper layer, the copper lay may be attached on the surface of the circuit board 300. A layer of copper with a thickness of about 20 microns is formed on the surface of the circuit board 300. The heat generated by the laser is diffused along the copper layer, so that the heat is diffused from the surface of the circuit board 300 to outside of the coverage region of the lens assembly 401.

The first heat dissipation member 501 may also be embedded in the circuit board 300, where a surface of the first heat dissipation member 501 is exposed on the surface of the circuit board 300. The circuit board 300 is provided with a groove 506 recessed from the surface. The first heat dissipation member 501 is embedded in the groove 506, so that an upper surface of the first heat dissipation member 501 is exposed on an upper surface of the circuit board 300. When the first heat dissipation member 501 is a copper block, the copper block may be embedded within the circuit board 300. To be specific, a groove 506 is provided along a thickness direction of the circuit board 300, and the copper block is placed into the groove 506, so that an upper surface of the copper block is exposed on the upper surface of the circuit board 300. Optionally, the circuit board 300 may also be penetrated through its thickness direction. In this case, the first heat dissipation member 501 with a copper-block structure penetrates the circuit board 300, with the upper surface and lower surface of the copper block being exposed on the upper surface and lower surface of the circuit board 300, respectively. In this way, heat may be dissipated along the upper and the lower surfaces of the circuit board. When the upper surface of the copper block is exposed, a portion of the heat generated by the laser is diffused along the upper surface of the copper block, and the other portion of heat is diffused downward along the copper block. Because the lower surface of the copper block is also exposed on the lower surface of the circuit board 300, and the lower surface of the circuit board 300 is thermally coupled to the lower enclosure 202 of the optical module, the heat diffused downward may be conducted to the lower enclosure 202, and thus heat dissipation is achieved via the lower enclosure 202.

To realize heat dissipation of the optical chip, the optical chip 406 is attached on the first heat dissipation member 501. The optical chip 406 may be wholly attached on the first heat dissipation member 501, or merely a portion of the optical chip 406 that generates a lot of heat is attached on the first heat dissipation member 501. In other words, only the laser and the detector that will generate a lot of heat are positioned on the first heat dissipation member 501, while the laser driving chip and the detector driving chip are attached on the circuit board 300. The lens assembly 401 is covered above/caps the optical chip 406. To prevent the lens assembly 401 from affecting the heat dissipation effect, in the embodiments, the other end of the first heat dissipation member 501 extends outwardly from the coverage region of the lens assembly 401, where the coverage region of the lens assembly 401 is the area shown by the dotted box A in FIG. 7 and FIG. 8.

A coverage region of the first heat dissipation member 501 on the circuit board 300 is greater than the coverage region of the lens assembly 401 on the circuit board 300. When heat is generated by the laser located at an end of the first heat dissipation member 501, the heat is diffused along the first heat dissipation member 501, where a diffusion direction is from right to left (see FIG. 7), so that the heat is diffused from the bottom of the lens assembly 401 to outside of the lens assembly 401. The first heat dissipation member 501 is configured to conduct the heat generated by the optical chip 406 to outside of the coverage region of the lens assembly 401, for example, conduct the heat generated by the laser to outside of the coverage region of the lens assembly 401.

In view of the above, to dissipate the heat generated by the laser located below the lens assembly 401, in the embodiments, the end of the first heat dissipation member 501 at which the optical chip 406 is attached is located below the lens assembly 401. In other words, the end attached with the laser is located below the lens assembly 401. The other end of the first heat dissipation member 501 is far away from the lens assembly 401, that is, extends outwardly from the lens assembly 401, so that heat below the lens assembly 401 may be diffused, along the first heat dissipation member 501, to outside of the coverage region of the lens assembly 401, thereby facilitating heat dissipation.

The optical chip 406 is attached at one end of the first heat dissipation member 501, and the lens assembly 401 is covered above/caps the optical chip 406. In other words, the laser is attached at one end of the first heat dissipation member 501, and the lens assembly 401 is covered above/caps the laser, while the lens assembly 401 is connected to the fiber ribbon 403. In this way, the first heat dissipation member 501 is located below the fiber ribbon 403. When performing heat dissipation via the first heat dissipation member 501, that is, performing heat dissipation by conducting heat to the upper enclosure 201, the fiber ribbon 403 is located between the upper enclosure 201 and the first heat dissipation member 501, and a thermally conductive member 600 is further disposed between the upper enclosure 201 and the first heat dissipation member 501. Therefore, the thermally conductive member 600 may have a positional conflict with the fiber ribbon 403. In view of the above, the fiber ribbon 403 may interfere with a heat dissipation path of the thermally conductive member 600.

Therefore, to prevent the fiber ribbon 403 from affecting heat dissipation, in the embodiments, the heat diffused to the end of the first heat dissipation member 501 that is far away from the lens assembly 401 needs to be guided to a relatively large area at two sides of the fiber ribbon 403. Therefore, to improve heat dissipation efficiency, a second heat dissipation member 502 is used in the embodiments so that heat may be diffused in a direction away from the fiber ribbon 403.

The second heat dissipation member 502 is located outside of the lens assembly 401, is attached at the end of the first heat dissipation member 501 that is far away from the lens assembly 401, and is configured to receive the heat conducted by the first heat dissipation member 501 and to conduct the heat toward both sides of the circuit board 300. The second heat dissipation member 502 may be perpendicular to the first heat dissipation member 501, or may not be perpendicular to the first heat dissipation member 501, provided that the heat may be diffused towards both sides of the optical fiber ribbon 403. In this case, the second heat dissipation member 502 may conduct the received heat to an area at both sides of the fiber ribbon 403, that is, conduct the received heat to both sides of the circuit board 300 along a width direction of the circuit board 300.

Figure 11:
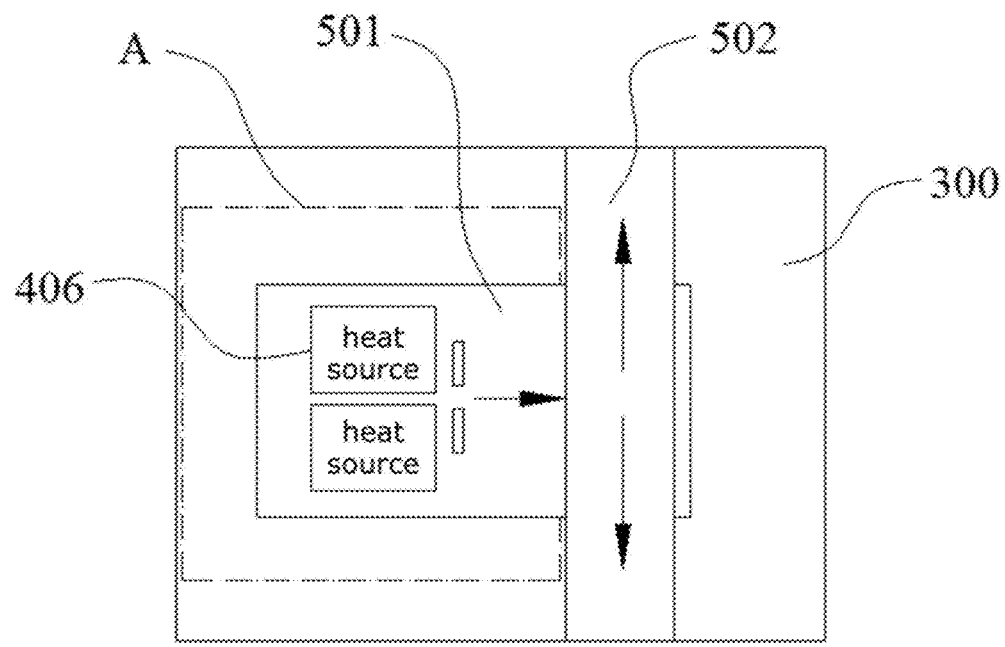
FIG. 11 is a diagram of a heat dissipation path of a heat dissipation structure according to an embodiment of this application.

FIG. 11 is a diagram of a heat dissipation path of a heat dissipation structure according to an embodiment of this application. Referring to FIG. 11, to conduct the heat to the area at both sides of the fiber ribbon 403, the second heat dissipation member 502, while being attached on the first heat dissipation member 501, further extends towards both sides of the fiber ribbon 403. In some embodiments of this application, an intermediate portion of the second heat dissipation member 502 is attached at the end of the first heat dissipation member 501 that is far away from the lens assembly 401. The two ends of the second heat dissipation member 502 extend towards both sides of the circuit board 300 along a direction perpendicular to the length of the first heat dissipation member 501, so that the second heat dissipation member 502 is perpendicular to the first heat dissipation member 501. In other words, the second heat dissipation member 502 and the first heat dissipation member 501 together form a T-shaped structure. The intermediate portion of the second heat dissipation member 502 is configured to receive the heat conducted by the first heat dissipation member 501, and diffuse the heat towards both ends along a length direction of the second heat dissipation member 502.

As the path shown in FIG. 11 illustrated by the arrow, the heat generated by the laser is diffused from one end (the end where the optical chip 406 is attached) of the first heat dissipation member 501 to the other end (which is far away from the lens assembly 401); since the second heat dissipation member 502 is attached at the other end in a perpendicularly way, heat will be diffused from the intermediate portion of the second heat dissipation member 502 towards both ends, thereby increasing a heat conduction area and accelerating/improving heat diffusion.

To improve heat dissipation effect, the second heat dissipation member 502 may be made of a highly thermally conductive material such as a ceramic plate (ALN), copper foil, or a carbon fiber material.

Regarding the optical module provided in this embodiment of this application, when performing heat dissipation, the heat generated by the laser is diffused along the surface of the circuit board 300, and is dissipated via the upper enclosure 201. Moreover, the second heat dissipation member 502 is provided on the circuit board 300, and is separated from the upper enclosure 201 by a certain distance. Therefore, to realize heat conduction between the second heat dissipation member 502 and the upper enclosure 201, in this embodiment, the heat conducted by the second heat dissipation member 502 is conducted to the upper enclosure 201 via a thermally conductive member 600, and then is dissipated by the upper enclosure 201.

Figure 12:
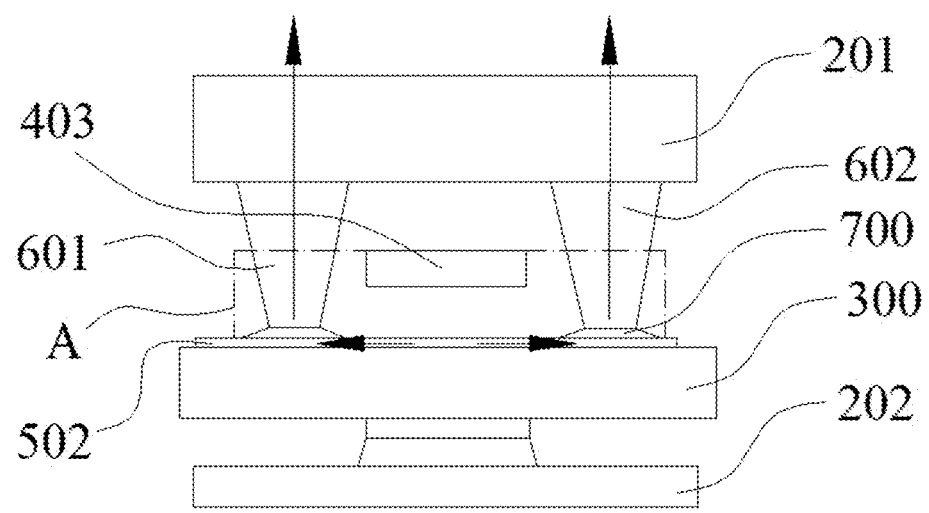
FIG. 12 is a longitudinal cross-sectional view of an optical module according to an embodiment of this application.

FIG. 12 is a longitudinal cross-sectional view of an optical module according to an embodiment of this application. Referring to FIG. 6, FIG. 8, and FIG. 12, the path indicated by the arrows in FIG. 12 is a path along which the heat is conducted from the second heat dissipation member 502 to the thermally conductive member 600 and then to the upper enclosure 201. The thermally conductive member 600 is disposed on an upper surface of the second heat dissipation member 502, and is configured to receive the heat conducted by the second heat dissipation member 502 and to conduct the heat in a direction away from the circuit board 300. The upper enclosure 201 is connected to one end of the thermally conductive member 600, and is configured to receive and dissipate the heat conducted by the thermally conductive member 600.

The thermally conductive member 600 is connected between the second heat dissipation member 502 and the upper enclosure 201, serves for conducting the heat and supporting the upper enclosure 201. The thermally conductive member 600 may conduct heat at the circuit board 300 to the upper enclosure 201. The upper enclosure 201 is a main heat dissipation surface of the optical module, thus realizing a better heat dissipation effect.

To provide the thermally conductive member 600 with a supporting function, in this embodiment, the thermally conductive member 600 is manufactured to be rigid. Moreover, the circuit board 300 is also rigid, and the second heat dissipation member 502 is laid on the circuit board 300. When the thermally conductive member 600 is in contact with the second heat dissipation member 502, the rigid structure of the thermally conductive member 600 is in contact with the rigid structure of the second heat dissipation member 502, which may easily cause abrasion to the thermally conductive member 600 or the second heat dissipation member 502. To reduce abrasion, in this embodiment, when the thermally conductive member 600 is in contact with the second heat dissipation member 502, a thermally conductive adhesive layer 700 is disposed therebetween, thereby realizing a soft contact between the thermally conductive member 600 and the second heat dissipation member 502.

The thermally conductive adhesive layer 700 is provided at both ends of the second heat dissipation member 502 and is provided between the second heat dissipation member 502 and the thermally conductive member 600, for increasing heat conduction efficiency. The thermally conductive adhesive layer 700 may be formed of a thermally conductive adhesive with good thermal conductivity performance. Connecting the second heat dissipation member 502 and the thermally conductive member 600 via the thermally conductive adhesive may not only avoid abrasion of the second heat dissipation member 502 or the thermally conductive member 600, but may also improve heat conduction efficiency.

A configuration of the thermally conductive adhesive layer 700 is determined by the configuration of the thermally conductive member 600. If the thermally conductive member 600 is all in contact with the second heat dissipation member 502, only one thermally conductive adhesive layer 700 may be provided to cover the entire surface of the second heat dissipation member 502. However, if the thermally conductive member 600 is merely in contact with the two ends of the second heat dissipation member 502, two thermally conductive adhesive layers 700 may be provided to respectively cover the two ends of the second heat dissipation member 502, so as to connect the second heat dissipation member 502 and the thermally conductive member 600.

In this embodiment, the heat generated by the optical chip 406, such as the laser, is diffused from the bottom of the lens assembly 401 to outside of the coverage region of the lens assembly 401 via the first heat dissipation member 501 and the second heat dissipation member 502, and is conducted to regions away from the fiber ribbon 403. Subsequently, the heat is conducted to the upper enclosure 201 via the thermally conductive member 600; thus, heat dissipation is achieved by using the upper enclosure 201. To this end, the thermally conductive member 600 may be independently adhered or mounted onto the circuit board 300, or may be integrally formed with the upper enclosure 201 to simplify the structure of the optical module. However, no matter the thermally conductive member 600 is separately mounted onto the circuit board 300 or is integrally formed with the upper enclosure 201, the thermally conductive member 600 in these two solutions may be designed to have a same structure, or have different structures.

Figure 13:
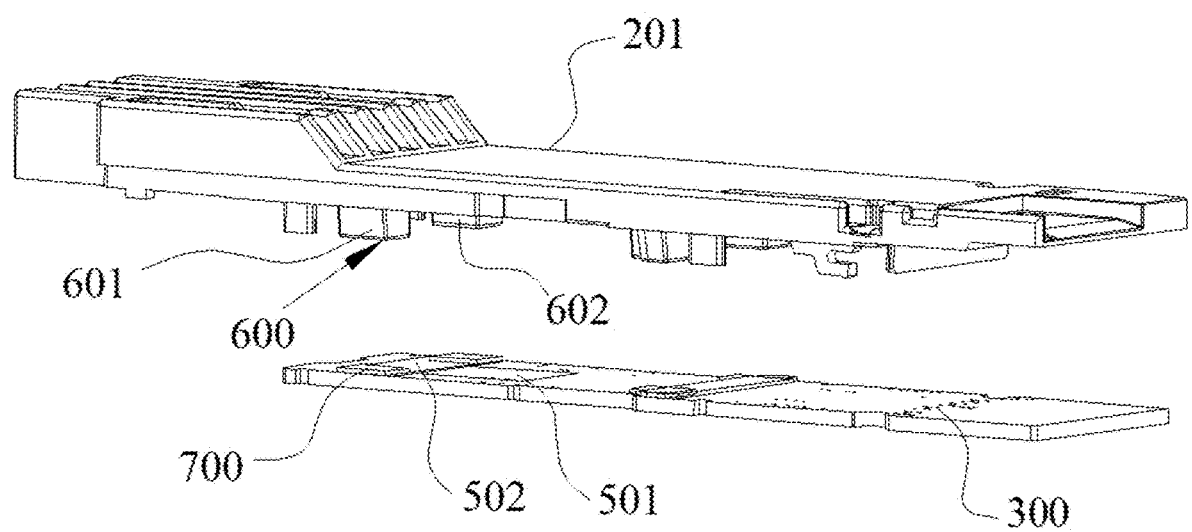
FIG. 13 is a schematic structural diagram illustrating an integral forming of a thermally conductive member and an upper enclosure according to an embodiment of this application.
Figure 14:
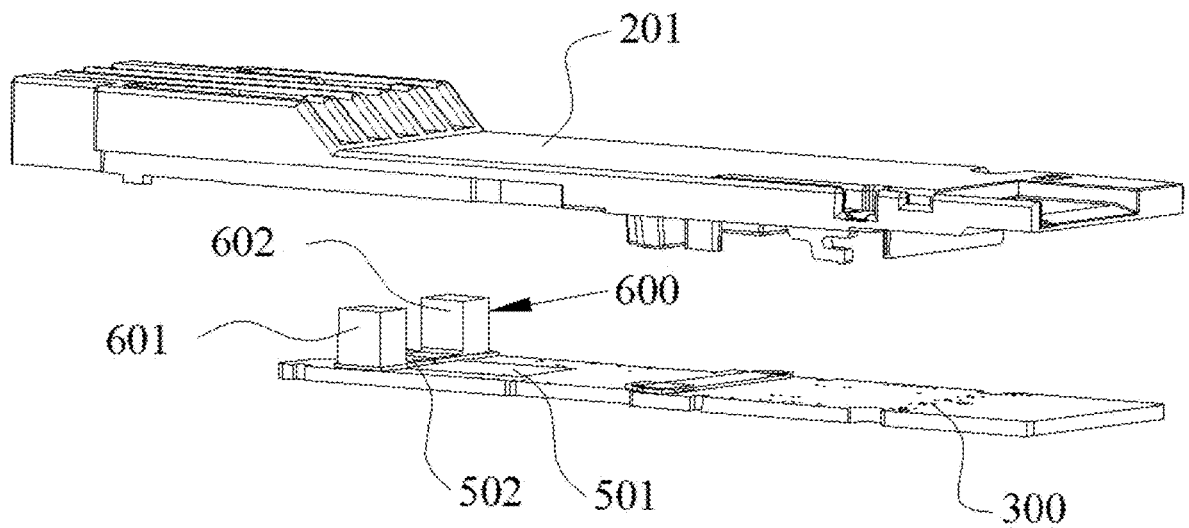
FIG. 14 is a schematic structural diagram illustrating that a thermally conductive member is mounted on a circuit board according to an embodiment of this application.
Figure 15:
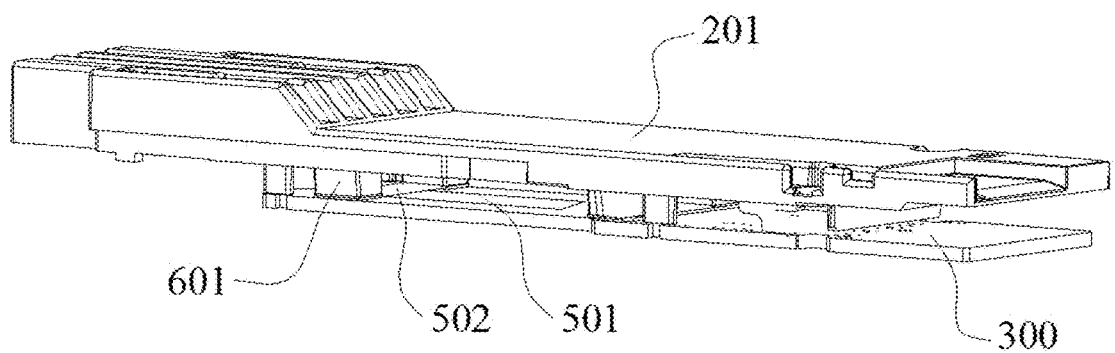
FIG. 15 is a schematic structural diagram of connecting an upper enclosure and a circuit board by using a thermally conductive member according to an embodiment of this application.

FIG. 13 is a schematic structural diagram of integrated forming of a thermally conductive member and an upper enclosure according to an embodiment of this application. FIG. 14 is a schematic structural diagram illustrating that a thermally conductive member is mounted on a circuit board according to an embodiment of this application. FIG. 15 is a schematic structural diagram of connecting an upper enclosure and a circuit board via a thermally conductive member according to an embodiment of this application.

Referring to FIG. 13, the thermally conductive member 600 is integrally formed with the upper enclosure 201. The thermally conductive member 600 is provided at a position of the upper enclosure 201 that corresponds to the second heat dissipation member 502, so that after the thermally conductive member 600 is integrally formed with the upper enclosure 201, one end of the thermally conductive member 600 may be connected/contacted with the upper surface of the second heat dissipation member 502. In this case, the heat transferred by the second heat dissipation member 502 is conducted to the upper enclosure 201 through the thermally conductive member 600, and then is dissipated via the upper enclosure 201.

Referring to FIG. 8, FIG. 14, and FIG. 15, when the thermally conductive member 600 is separately designed and mounted onto the circuit board 300, to allow the fiber ribbon 403 to pass through, a notch is provided in the thermally conductive member 600. In some embodiments of this application, the thermally conductive member 600 includes a first thermally conductive column 601, a second thermally conductive column 602, and a heat conduction part 603, where a height of the heat conduction part 603 is smaller than heights of the first thermally conductive column 601 and the second thermally conductive column 602. To get out of the way of the fiber ribbon 403, an area for passing-through of the fiber ribbon 403 needs to be provided in the thermally conductive member 600. To be specific, a gap/notch is formed between the first thermally conductive column 601 and the second thermally conductive column 602, and the fiber ribbon 403 may pass through the gap/notch. To this end, the thermally conductive member 600 may have a "|⊔|" structure. In other words, the first thermally conductive column 601, the heat conduction part 603, and the second thermally conductive column 602 are sequentially connected, to form a "|⊔|" structure.

The first thermally conductive column 601 and the second thermally conductive column 602 are located at two ends of the heat conduction part 603, so that a reserved gap is formed between the first thermally conductive column 601 and the second thermally conductive column 602, for avoiding interference with the fiber ribbon 403. The first thermally conductive column 601 is configured to connect one end of the second heat dissipation member 502 to the upper enclosure 201. The second thermally conductive column 602 is configured to connect the other end of the second heat dissipation member 502 to the upper enclosure 201. Thus, both the first thermally conductive column 601 and the second thermally conductive column 602 are in contact with only one end portion of the second heat dissipation member 502. In other words, heat is conducted from one end of the second heat dissipation member 502 to the first thermally conductive column 601, or is conducted from the other end of the second heat dissipation member 502 to the second thermally conductive column 602.

However, the intermediate portion of the second heat dissipation member 502 also receives the heat transferred from the first heat dissipation member 501. Therefore, to improve the heat dissipation effect, in the embodiments, the first thermally conductive column 601 is connected to the second thermally conductive column 602 via the heat-conducting part 603, so that heat of the second heat dissipation member 502 may be transferred to the first thermally conductive column 601 and the second thermally conductive column 602 through the heat conduction part 603. In this case, the heat conduction part 603 is connected to the intermediate portion of the second heat dissipation member 502, and is configured to receive heat conducted by the intermediate portion of the second heat dissipation member 502 and diffuse the heat to both ends.

The heat conduction part 603 located at the intermediate portion is designed to avoid interference with the fiber ribbon 403, and to receive heat from the intermediate portion of the second heat dissipation member 502, where the heat is divided into two portions, one portion is diffused to the first thermally conductive column 601, and the other portion is diffused to the second thermally conductive column 602. In this case, the heat diffused by the second heat dissipation member 502 may be completely conducted to the upper enclosure 201 via the first thermally conductive column 601 and the second thermally conductive column 602.

In some embodiments of this application, the first thermally conductive column 601 is connected to one end of the heat conduction part 603 for receiving the heat transferred by the heat conduction part 603. A bottom surface of the first thermally conductive column 601 is attached at one end of the second heat dissipation member 502 to receive the heat that is diffused to this end by the second heat dissipation member 502. A top surface of the first thermally conductive column 601 is connected to the upper enclosure 201 to conduct the received heat, that is conducted by the heat conduction part 603 and is conducted by one end of the second heat dissipation member 502, to the upper enclosure 201; afterwards, the heat is dissipated by using the upper enclosure 201.

The second thermally conductive column 602 is connected to the other end of the heat conduction part 603, for receiving the heat transferred by the heat conduction part 603. A bottom surface of the second thermally conductive column 602 is attached at the other end of the second heat dissipation member 502 to receive the heat that is diffused to this end by the second heat dissipation member 502. A top surface of the second thermally conductive column 602 is connected to the upper enclosure 201 to conduct the received heat, that is conducted by the heat conduction part 603 and is conducted by the other end of the second heat dissipation member 502, to the upper enclosure 201; then, the heat is dissipated via the upper enclosure 201.

In other embodiments, the thermally conductive member 600 may include a heat conduction part 603 and a first thermally conductive column 601. The heat conduction part 603 is perpendicularly connected to the first thermally conductive column 601, to form an L-shaped structure. One end of the first thermally conductive column 601 may be thermally connected to the heat conduction part 603, and the first thermally conductive column 601 may also extend upward at one end of the heat conduction part 603 to form an L-shaped structure. During heat conduction, the thermally conductive member 600 is provided with two sets of L-shaped structures, which are respectively located at both sides of the second heat dissipation member 502. The two sets of L-shaped structures are symmetrically disposed in a vertical direction. The two sets of L-shaped structures may be in contact or may not be in contact with each other, and a contact portion correspondingly forms the heat conduction part 603. For heat dissipation process of the thermally conductive member 600 in this embodiment, reference may be made to the heat dissipation process of the thermally conductive member 603 provided in the foregoing embodiments, and details are not described herein again.

Regarding the optical module provided in the foregoing embodiments, to dissipate the heat generated by the laser below the lens assembly 401 via the upper enclosure 201, the first heat dissipation member 501 is provided on the surface of the circuit board 300. One end of the first heat dissipation member 501 is attached with the laser and is located below the lens assembly 401, and the other end is located outside the coverage region of the lens assembly 401. In this way, the heat generated by the laser is diffused from one end to the other end. Moreover, the other end is connected with the second heat dissipation member 502 that is perpendicular to the first heat dissipation member 501, so as to increase a heat diffusion area. The second heat dissipation member 502 is connected to the upper enclosure 201 via the thermally conductive member 600. The second heat dissipation member 502 may conduct the heat diffused from the first heat dissipation member 501 to the upper enclosure through the thermally conductive member 600; afterwards, the heat is dissipated via the upper enclosure 201, so as to realize a better heat dissipation performance.

To improve the heat dissipation efficiency of the optical module, the optical module provided in the embodiments of this application may also adopt a solution where heat is dissipated via the lower enclosure 202. That is, on the basis of the structure of the optical module provided in the foregoing embodiments, heat may also be simultaneously dissipated by the upper enclosure 201 and the lower enclosure 202 of the optical module.

Referring to the cross-sectional view of the circuit board shown in FIGS. 10A-Cagain, to improve heat dissipation effect, on the basis of the solution provided in the foregoing embodiments where the circuit board 300 is attached with the first heat dissipation member 501 and the second heat dissipation member 502, a third heat dissipation member 503 may be further embedded within the circuit board 300. Regarding the optical module provided in the embodiments of this application, on the basis that the circuit board 300 is attached with the first heat dissipation member 501 and the second heat dissipation member 502, the third heat dissipation member 503 may be further internally provided between multilayer plates of the circuit board 300, so that both an upper surface and a lower surface of the third heat dissipation member are not exposed on the upper surface and the lower surface of the circuit board 300.

The circuit board 300 includes a plurality of multilayer plates, and the third heat dissipation member 503 may occupy several intermediate layers of the circuit board 300. For example, if the circuit board 300 includes eight multilayer plates that are numbered "first, second . . . seventh, and eighth" from one side surface to the other side surface, the third heat dissipation member 503 may be provided in the third to sixth layers in the middle, while circuits may be provided in the first, the second, the seventh, and the eighth layers. The third heat dissipation member 503 is made of a copper material, for example, a copper block. In the embodiments, the first heat dissipation member 501 is a copper layer.

The third heat dissipation member 503 is built in the circuit board 300, where a portion of the third heat dissipation member 503 is located below the lens assembly 401, and the other portion is located outside of the lens assembly 401. The third heat dissipation member 503 may conduct heat from one side of the surface of the circuit board 300 to the other side. A coverage region of the third heat dissipation member 503 is the same as or similar to a coverage region of the first heat dissipation member 501 attached on the surface of the circuit board 300 that is provided in the foregoing embodiments, both extending from one end at which the optical chip 406 is adhered to outside of the coverage region of the lens assembly 401. Cross-sectional areas of the first heat dissipation member 501 and the third heat dissipation member 503 may be the same or may be different; this may be determined according to specific application.

To diffuse the heat generated by the laser below the lens assembly 401 to outside of the coverage region of the lens assembly 401, the third heat dissipation member 503 is provided at a position corresponding to that of the first heat dissipation member 501. To be specific, one end of the third heat dissipation member 503 is located below one end of the first heat dissipation member 501 that is attached with the laser, and the other end of the third heat dissipation member 503 is located below the second heat dissipation member 502.

When the first heat dissipation member 501 is in a copper-layer structure, and the third heat dissipation member 503 occupies several inner layers of the circuit boar 300 so that the third heat dissipation member 503 is not in direct contact with the first heat dissipation member 501, a heat dissipation rate is relatively small. Therefore, the third heat dissipation member 503 cannot absorb the heat that is generated by the optical chip 406 and is conducted by the first heat dissipation member 501. To this end, for the optical module provided in the embodiments of this application, in the circuit board 300, several through holes 504 are provided in a region between the first heat dissipation member 501 and the third heat dissipation member 503, and the heat generated by the laser is conducted from the first heat dissipation member 501 to the third heat dissipation member 503 via the through hole 504. In this case, the heat generated by the laser is conducted along a side surface of the circuit board 300 via the first heat dissipation member 501, and can also be absorbed by the third heat dissipation member 503. Dissipating heat by the third heat dissipation member 503 that is with a copper-block design may improve the heat dissipation efficiency.

The through holes 504 penetrate the multilayer plates of the circuit board 300, are filled with thermally conductive material, and are configured to perform heat conduction. The thermally conductive material includes a thermally conductive ceramic, aluminum foil, a carbon fiber material, or the like. For example, the through hole 504 may be provided in the first and second layers or in the seventh and eighth layers of the circuit board 300.

Figure 16A:
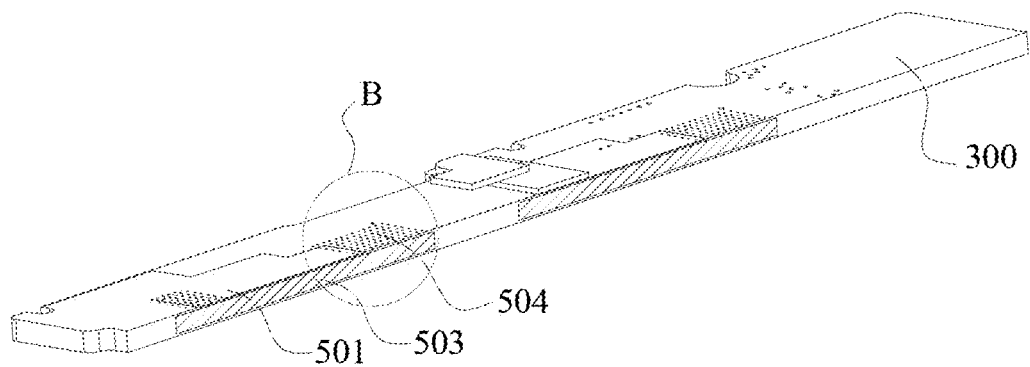
FIG. 16A is a sectional view of an inner structure of a circuit board according to an embodiment of this application.
Figure 16B:
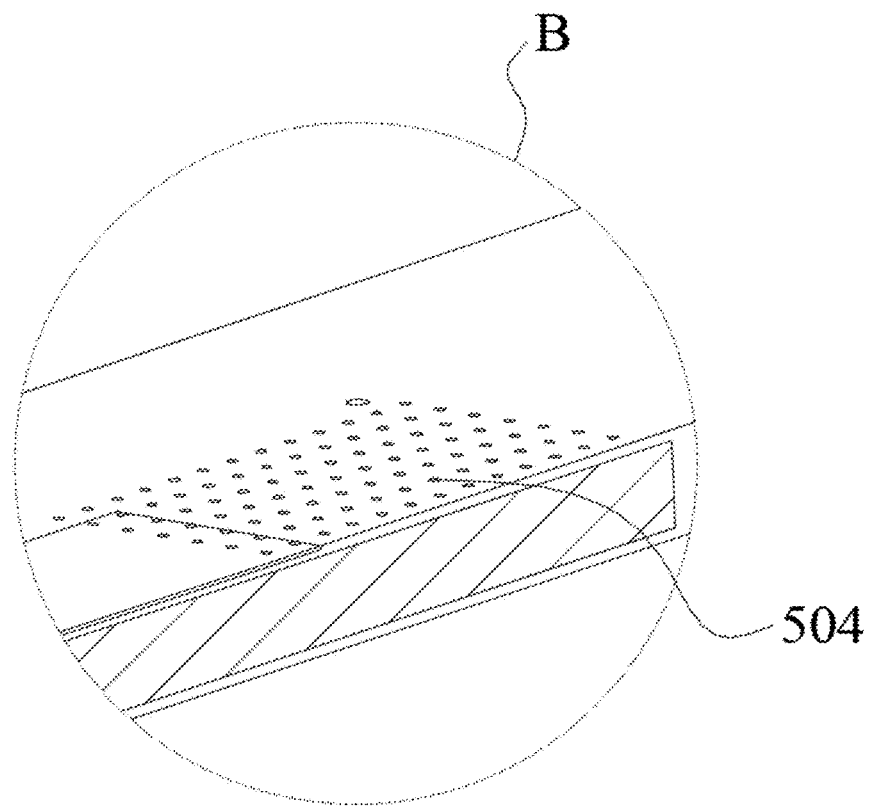
FIG. 16B is a partial sectional view of area B of the inner structure of the circuit board of FIG. 16A.
Figure 17:
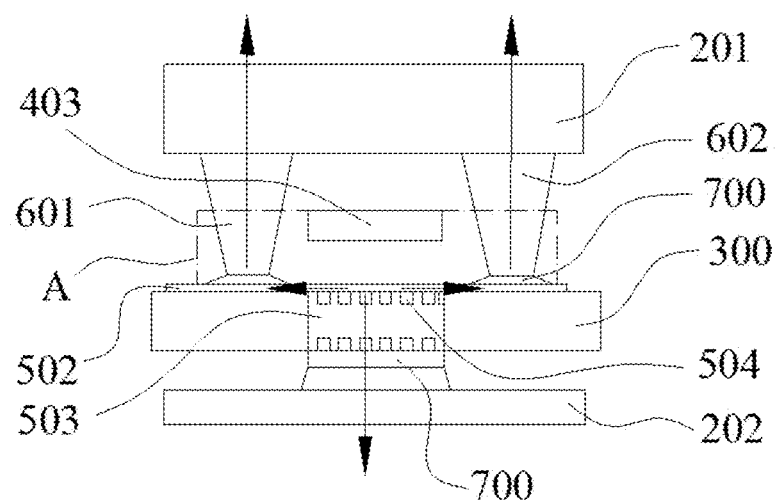
FIG. 17 is another longitudinal cross-sectional view of an optical module according to an embodiment of this application.

FIG. 16 is a sectional view of an inner structure of a circuit board according to an embodiment of this application. FIG. 17 is another longitudinal cross-sectional view of an optical module according to an embodiment of this application. Referring to FIG. 16 and FIG. 17, in the circuit board 300, through holes 504 are provided in the region between the third heat dissipation member 503 and the first heat dissipation member 501, where the through holes 504 are located in the circuit board 300 and are connected between an upper surface of the third heat dissipation member 503 and a side surface of the circuit board 300. The third heat dissipation member 503 and the first heat dissipation member 501 are thermally coupled through the through holes 504, so that a heat conduction is realized between the third heat dissipation member 503 and the first heat dissipation member 501. To be specific, the first heat dissipation member 501 conducts the heat generated by the laser to the third heat dissipation member 503 via the through holes 504; subsequently, the third heat dissipation member 503 diffuses the heat from one end located below the laser to outside of the coverage region of the lens assembly 401 in a longitudinal direction; afterwards, the third heat dissipation member 503 further transfers the heat back to the first heat dissipation member 501 via the through holes 504; the first heat dissipation member 501 conducts the heat to the second heat dissipation member 502, and finally, heat dissipation is performed via the thermally conductive member 600 and the upper enclosure 201.

In the embodiments, conduction efficiency from the first heat dissipation member 501 to the second heat dissipation member 502 is improved by the third heat dissipation member 503. A heat dissipation path is as follows: the heat generated by the laser is absorbed by one end of the first heat dissipation member 501, where a part of the heat is directly conducted to the other end of the first heat dissipation member 501 along the first heat dissipation member 501, and the other part of the heat is conducted to the third heat dissipation member 503 via the through holes 504; this part of heat is conducted by the third heat dissipation member 503 to an end close to the second heat dissipation member 502 in a longitudinal direction; the heat is further conducted, at this end, to the first heat dissipation member 501 via the through holes 504; the received heat generated by the laser (including the heat directly conducted along the first heat dissipation member 501 and the heat conducted from the third heat dissipation member 503) is conducted from the first heat dissipation member 501 to the second heat dissipation member 502.

To realize heat diffusion, the through holes 504 may be provided in all regions of the third heat dissipation member 503 that correspond to the first heat dissipation member 501. These regions include a region of the circuit board 300 that is between the upper surface of the third heat dissipation member 503 and a lower surface of the first heat dissipation member 501. In this case, the first heat dissipation member 501 and the third heat dissipation member 503 are thermally coupled via the through hole 504, while the third heat dissipation member 503 and the second heat dissipation member 502 are not directly thermally connected. In addition, in other embodiments, the through holes 504 may further be provided in an end region of the third heat dissipation member 503 (the end region includes a region of the circuit board 300 that is corresponding to the optical chip 406) corresponding to the first heat dissipation member 501. Meanwhile, through holes 504 may further be provided, in the circuit board 300, in a region of the third heat dissipation member 503 that corresponds to second heat dissipation member 502. In this case, the second heat dissipation member 502 and the third heat dissipation member 503 are thermally connected via the through holes 504, and the third heat dissipation member 503 may directly conduct the heat conducted by the first heat dissipation member 501 to the second heat dissipation member 502.

In some embodiments, through holes 504 are provided in all regions. In this case, a plurality of through holes 504 are evenly provided in the circuit board 300 between the first heat dissipation member 501 and the third heat dissipation member 503. The heat generated by the laser is first conducted to the first heat dissipation member 501, and the first heat dissipation member 501 conducts a part of the heat downward via the through holes 504 below the laser, and thus conducts the heat to the third heat dissipation member 503. The first heat dissipation member 501 diffuses the other part of the heat to outside of the coverage region of the lens assembly 401 along the surface of the first heat dissipation member 501, that is, diffuses the heat to a position at which the first heat dissipation member 501 is in contact with the second heat dissipation member 502. Meanwhile, regarding the heat diffused along the surface of the first heat dissipation member 501, during a process of being diffused to the second heat dissipation member 502, may be further conducted between the first heat dissipation member 501 and the third heat dissipation member 503 via the midway through holes 504. In view of the above, the first heat dissipation member 501 may conduct the heat in two directions that are perpendicular to each other. The third heat dissipation member 503 may receive, through the through holes 504, heat diffused from an end portion of the first heat dissipation member 501, as well as heat diffused from a middle portion of the first heat dissipation member 501. The third heat dissipation member 503 conducts the received heat to an end located below the second heat dissipation member 502 in a longitudinal direction, and conducts, through the corresponding through holes 504, the heat back to the end of the first heat dissipation member 501 that is close to the second heat dissipation member 502. The first heat dissipation member 501 conducts all of the heat to the second heat dissipation member 502; the heat is further conducted to the thermally conductive member 600 by the second heat dissipation member 502, and is finally dissipated via the upper enclosure 201. In this way, the heat dissipation efficiency is high. In view of the above, by using the through holes 504, bidirectional heat conduction may be achieved between the first heat dissipation member 501 and the third heat dissipation member 503 at the region where the first heat dissipation member 501 is corresponding to the third heat dissipation member 503.

In some embodiments, through holes 504 are provided in an end-portion region. A plurality of through holes 504 are evenly provided, in the circuit board 300, between the corresponding first heat dissipation member 501 and third heat dissipation member 503 below the laser. Alternatively, a plurality of through holes 504 may be evenly provided, in the circuit board 300, corresponding to a position at which the first heat dissipation member 501 is attached with the second heat dissipation member 502. In this case, the through holes 504 are provided at both ends of the third heat dissipation member 503. The heat generated by the laser is first conducted to the first heat dissipation member 501, and the first heat dissipation member 501 conducts a part of the heat downward via the through holes 504 below the laser, so that the heat is conducted to the third heat dissipation member 503. The first heat dissipation member 501 diffuses the other part of the heat to the outside of the coverage region of the lens assembly 401 along the surface of the first heat dissipation member 501, that is, diffuses the heat to a position at which the first heat dissipation member 501 is in contact with the second heat dissipation member 502. When the heat is diffused to the second heat dissipation member 502, the first heat dissipation member 501 may further conduct, via the through holes 504 in this region, a small part of the heat downward to the third heat dissipation member 503, and diffuse the other part of the heat to the second heat dissipation member 502, so that the heat is dissipated after being conducted to the upper enclosure 201 via the thermally conductive member 600. In view of the above, the first heat dissipation member 501 may conduct the heat in two directions that are perpendicular to each other. The third heat dissipation member 503 may receive, via the through holes 504, the heat diffused from both ends of the first heat dissipation member 501. Meanwhile, the third heat dissipation member 503 may laterally conduct the received heat to an end located below the second heat dissipation member 502, and conduct the heat to the first heat dissipation member 501 via the corresponding through holes 504. Subsequently, the heat is conducted to the thermally conductive member 600 via the second heat dissipation member 502, and is finally dissipated via the upper enclosure 201. In this way, the heat dissipation efficiency is high. In view of the above, via the through holes 504, bidirectional heat conduction may be achieved between the first heat dissipation member 501 and the third heat dissipation member 503 at the region where the first heat dissipation member 501 is corresponding to the third heat dissipation member 503.

To dissipate heat via the lower enclosure 202 of the optical module, in the embodiments, when heat is dissipated via the lower enclosure 202, the lower surface of the circuit board 300 is attached with a fourth heat dissipation member 505, as shown in FIGS. 10A and 10B. The fourth heat dissipation member 505 and the first heat dissipation member 501 are respectively attached at two opposite sides of the circuit board 300. The fourth heat dissipation member 505 and the first heat dissipation member 501 may have a same structure, and both have a copper-layer structure or an embedded copper-block structure. The fourth heat dissipation member 505 is thermally coupled to the lower enclosure 202 of the optical module. Through holes 504 are provided between the fourth heat dissipation member and a lower surface of the third heat dissipation member 503. The through holes 504 are configured to receive the heat conducted by the third heat dissipation member 503, and to conduct the heat to the lower enclosure 202 via the fourth heat dissipation member 505. For example, if the through holes 504 between the first heat dissipation member 501 and the third heat dissipation member 503 are provided in the first and second multilayer plates of the circuit board 300, through holes 504 between the third heat dissipation member 503 and the fourth heat dissipation member 505 are provided in the seventh and eighth multilayer plates of the circuit board 300.

The heat generated by the laser is conducted to the third heat dissipation member 503 via the first heat dissipation member 501 and the through holes 504 (that are located between the first heat dissipation member 501 and the third heat dissipation member 503). The third heat dissipation member 503 continues to conduct the heat downward to the fourth heat dissipation member through the through holes 504 (that are located between the fourth heat dissipation member 505 and the third heat dissipation member 503) at the lower surface of the third heat dissipation member 503. Further, the heat is conducted to the lower enclosure 202 by the fourth heat dissipation member 505, and is dissipated via the lower enclosure 202. According to the optical module of the embodiment, the heat generated by the laser may be dissipated via both the upper enclosure 201 and the lower enclosure 202, and thus the heat dissipation efficiency is higher.

When performing heat dissipation in the optical module by the first heat dissipation member 501, the second heat dissipation member 502, the third heat dissipation member 503, and the fourth heat dissipation member 505, the first heat dissipation member 501 and the fourth heat dissipation member 505 may be copper layers provided on the surface of the circuit board 300, or may be copper blocks embedded in the circuit board 300. When the first heat dissipation member 501 and the fourth heat dissipation member 505 are copper blocks, grooves 506 are provided on side surfaces of the circuit board 300, as illustrated by Arrow A and Arrow B in FIG. 10C. To be specific, a groove 506 is provided in the first and second layers of the circuit board 300, or a groove 506 may be provided in the seventh and eighth layers. The copper blocks are mounted in the grooves 506, and an upper surface of the copper block is exposed on the surface of the circuit board 300. For a specific implementation solution that the first heat dissipation member 501 and the fourth heat dissipation member 505 are copper layers or copper blocks, reference may be made to the content in the foregoing embodiments, and details are not described herein again.

To realize soft contact between the lower surface of the circuit board 300 and the lower enclosure 202, a thermally conductive adhesive layer 700 is disposed between the circuit board 300 and the lower enclosure 202. The structure and material of the thermally conductive adhesive layer 700 in the embodiments may be same as those in the foregoing embodiments, and details are not described herein again.

In another embodiment, different from the optical module provided in the foregoing embodiments, the first heat dissipation member 501 and the second heat dissipation member 502 are not attached together, but the second heat dissipation member 502 is thermally coupled to the third heat dissipation member 503 via the through holes 504. The second heat dissipation member 502 is attached on the circuit board 300, located outside of the lens assembly 401, and is opposite to one end of the third heat dissipation member 503. The second heat dissipation member 502 is configured to receive and diffuse the heat conducted by the third heat dissipation member.

In this embodiment, a coverage region of the third heat dissipation member 503 extend beyond that of the first heat dissipation member 501. Because the first heat dissipation member 501 is not in contact with the second heat dissipation member 502, the function of the first heat dissipation member 501 is to diffuse the heat generated by the laser attached thereon to outside of the coverage region of the lens assembly 401, and further conduct, via the through holes 504, the heat to the third heat dissipation member 503 provided in inner layers of the circuit board 300, and further diffuse heat quickly by the third heat dissipation member 503.

The third heat dissipation member 503 longitudinally diffuses the heat conducted received from the first heat dissipation member 501, and conducts the heat to a position below the second heat dissipation member 502. The through holes 504 are provided between the second heat dissipation member 502 and the third heat dissipation member 503, and heat conduction between the second heat dissipation member 502 and the third heat dissipation member 503 is achieved via the through holes between the second heat dissipation member 502 and the third heat dissipation member 503. The third heat dissipation member 503 conducts the heat to the second heat dissipation member 502 via the through holes 504. Finally, heat dissipation is achieved by the thermally conductive member 600 and the upper enclosure 201.

According to the optical module in the foregoing plurality of embodiments, a first heat dissipation member 501 is provided on the surface of the circuit board 300 or is provided in an embedded way. The heat generated by the laser is conducted to the upper enclosure 201 through the thermally conductive member 600 by the first heat dissipation member 501 and the second heat dissipation member 502 that are disposed on the surface of the circuit board 300, thus realizing a heat dissipation via the upper enclosure 201. By embedding a third heat dissipation member 503 in several intermediate/inner layers of the circuit boar 300, the heat generated by the laser is conducted to the lower enclosure 202 via the third heat dissipation member 503 provided within/inside of the circuit board 300 and the corresponding through holes 504, thus realizing a heat dissipation via the lower enclosure 202. Meanwhile, the third heat dissipation member 503 longitudinally diffuses the heat received from the first heat dissipation member 501 to a position close to the second heat dissipation member 502, and conducts the heat to the first heat dissipation member 501 again via the through holes 504. By the first heat dissipation member 501, the heat is all conducted to the second heat dissipation member 502, and is finally dissipated after passing through the thermally conductive member 600 and the upper enclosure 201. In view of the above, the optical modules provided in the embodiments of this application can all realize heat dissipation for a laser, and may have a higher heat dissipation efficiency.

It may be learned from the foregoing schemes, in an optical module provided in the embodiments of this application, the first heat dissipation member 501 is provided on the circuit board 300, one end of the first heat dissipation member 501 is attached with the optical chip 406, and the lens assembly 401 is covered on/caps the optical chip 406. The other end of the first heat dissipation member 501 extends outwardly from the coverage area of the lens assembly 401, so that the heat generated by the optical chip 406 is diffused from the bottom of the lens assembly 401 to outside of the lens assembly, and is conducted to a side surface of the circuit board 300. The third heat dissipation member 503 is embedded in the intermediate layers of the circuit board 300, with a portion positioned below the lens assembly 401 and the other portion positioned outside of the lens assembly 402. The through holes 504, for performing heat conduction, penetrate the multilayer plates of the circuit board 300 and are filled with a thermally conductive material. The through holes 504 are provided between the first heat dissipation member 501 and the third heat dissipation member 503 to realize a heat conduction between the first heat dissipation member 501 and the third heat dissipation member 503. One end of the first heat dissipation member 501 that is far away from the lens assembly 401 is provided with the second heat dissipation member 502. The upper surface of the second heat dissipation member 502 is provided with the thermally conductive member 600, and the upper surface of the thermally conductive member 600 is thermally connected with the upper enclosure 201. The heat conducted by the first heat dissipation member 501 and the heat diffused via the third heat dissipation member 503 is conducted to the second heat dissipation member 502 by the first heat dissipation member 501, and is further conducted to the upper enclosure 201 via the thermally conductive member 600, so as to achieve a heat dissipation via the upper enclosure 201. In view of the above, according to the optical module provided in the embodiments of this application, the heat generated by the optical chip 406 covered by the lens assembly 401 may be diffused to outside of the coverage region of the lens assembly 401 by using the first heat dissipation member 501. Moreover, a heat conduction area may be increased by the second heat dissipation member 502, the thermally conductive member 600, and the third heat dissipation member 503, so that heat can be dissipated from the upper enclosure 201 with a better heat dissipation effect.

Finally, it should be noted that the foregoing embodiments are merely intended to describe the technical solutions of the present disclosure, and shall not be construed as limitation. Although the present disclosure is described in detail with reference to the foregoing embodiments, one of ordinary skills in the art may understand that modifications still may be made to the technical solutions disclosed in the foregoing embodiments, or equivalent replacements may be made to some of the technical features. However, these modifications or equivalent replacements do not deviate the nature of corresponding technique solutions from the spirit and scope of the technique solutions of the embodiments of the present disclosure.

What is claimed is:

1. An optical module, comprising:
   an upper enclosure;
   a lower enclosure;
   a circuit board disposed in a chamber enclosed by the upper enclosure and the lower enclosure;
   an optical chip electrically coupled to the circuit board and configured to transmit and/or receive an optical signal;
   a lens assembly mounted on the circuit board, wherein the lens assembly covers the optical chip and is configured to propagate a light beam;
   a heat dissipation structure comprising:
     a first heat dissipation member provided on the circuit board, wherein a portion of the first heat dissipation member is located below the lens assembly, and the other portion is located outside of the lens assembly; wherein the optical chip is attached to one end of the first heat dissipation member, and the first heat dissipation member is configured to conduct heat generated by the optical chip to outside of a coverage region of the lens assembly;
     a second heat dissipation member attached to the first heat dissipation member, wherein the second heat dissipation member is provided outside of the lens assembly, and is configured to receive and diffuse heat conducted by the first heat dissipation member;
     a third heat dissipation member embedded in intermediate layers of the circuit board, wherein a portion of the third heat dissipation member is located below the lens assembly, and the other portion is located outside of the lens assembly, and wherein one end of the third heat dissipation member is located below one end of the first heat dissipation member that is disposed with the optical chip, and the other end of the third heat dissipation member is located below the second heat dissipation member; and
     a plurality of through holes penetrating multilayer plates of the circuit board, the plurality of through holes being filled with a thermally conductive material, wherein some of the plurality of through holes are located between the first heat dissipation member and the third heat dissipation member, and are configured to perform heat conduction between the first heat dissipation member and the third heat dissipation member; and
   a thermally conductive member disposed on an upper surface of the second heat dissipation member and configured to receive heat conducted by the second heat dissipation member, wherein one end of the thermally conductive member is thermally coupled to the upper enclosure for conducting the heat to the upper enclosure.

2. The optical module according to claim 1, wherein a lower surface of the circuit board is disposed with a fourth heat dissipation member; the fourth heat dissipation member is thermally coupled to the lower enclosure; the plurality of through holes provided in the circuit board comprises through holes located between the fourth heat dissipation member and the third heat dissipation member, and the through holes located between the fourth heat dissipation member and the third heat dissipation member are configured to receive heat conducted by the third heat dissipation member and conduct the heat to the lower enclosure via the fourth heat dissipation member.

3. The optical module according to claim 1, wherein the first heat dissipation member is attached onto a surface of the circuit board.

4. The optical module according to claim 1, wherein the first heat dissipation member is embedded in the circuit board, with a surface of the first heat dissipation member being exposed on a surface of the circuit board.

5. The optical module according to claim 1, wherein an intermediate region of the thermally conductive member is provided with a notch for passing through of a fiber ribbon.

6. The optical module according to claim 5, wherein the thermally conductive member comprises:
 a heat conduction part thermally coupled to the second heat dissipation member, wherein the heat conduction part is configured to receive heat conducted by the second heat dissipation member and to diffuse the heat towards both ends; and
 a first thermally conductive column connected to the heat conduction part, wherein a bottom surface of the first thermally conductive column is attached to one end of the second heat dissipation member, and a top surface of the first thermally conductive column is connected to the upper enclosure; wherein the first thermally conductive column is configured to receive heat conducted by the heat conduction part and dissipate the heat via the upper enclosure.

7. The optical module according to claim 6, wherein the thermally conductive member further comprises:
 a second thermally conductive column connected to the heat conduction part, wherein a bottom surface of the second thermally conductive column is attached atto the other end of the second heat dissipation member, and a top surface of the second thermally conductive column is connected to the upper enclosure; wherein the second thermally conductive column is configured to receive heat conducted by the heat conduction part and dissipate the heat via the upper enclosure.

8. The optical module according to claim 1, further comprising:
 a thermally conductive adhesive layer provided at both ends of the second heat dissipation member, wherein the thermally conductive adhesive layer is provided between the second heat dissipation member and the thermally conductive member, and is configured to increase heat conduction efficiency.

9. An optical module, comprising:
 an upper enclosure;
 a lower enclosure;
 a circuit board disposed in a chamber enclosed by the upper enclosure and the lower enclosure;
 an optical chip electrically coupled to the circuit board and configured to transmit and/or receive an optical signal;
 a lens assembly mounted on the circuit board, wherein the lens assembly covers the optical chip and is configured to propagate a light beam;
 a heat dissipation structure comprising:
 a first heat dissipation member provided on the circuit board, wherein a portion of the first heat dissipation member is located below the lens assembly, and the other portion is located outside of the lens assembly; wherein the optical chip is attached to one end of the first heat dissipation member, and the first heat dissipation member is configured to conduct heat generated by the optical chip to outside of a coverage region of the lens assembly;
 a third heat dissipation member embedded in intermediate layers of the circuit board, wherein a portion of the third heat dissipation member is located below the lens assembly, and the other portion is located outside of the lens assembly, and wherein one end of the third heat dissipation member is located below one end of the first heat dissipation member that is disposed with the optical chip, and the other end of the third heat dissipation member is located below a second heat dissipation member;
 the second heat dissipation member attached to the circuit board, wherein the second heat dissipation member is provided outside of the lens assembly, opposite to the portion of the third heat dissipation member that is located outside of the lens assembly, and configured to receive and diffuse heat conducted by the third heat dissipation member;
 and a plurality of through holes penetrating multilayer plates of the circuit board, the plurality of through holes being filled with a thermally conductive material, wherein some of the plurality of through holes are located between the first heat dissipation member and the third heat dissipation member and between the second heat dissipation member and the third heat dissipation member, and are configured to perform heat conduction between the first heat dissipation member and the third heat dissipation member and between the second heat dissipation member and the third heat dissipation member; and
 a thermally conductive member disposed on an upper surface of the second heat dissipation member and configured to receive heat conducted by the second heat dissipation member, wherein one end of the thermally conductive member is thermally coupled to the upper enclosure for conducting the heat to the upper enclosure.

10. The optical module according to claim 9, wherein a lower surface of the circuit board is disposed with a fourth heat dissipation member; the fourth heat dissipation member is thermally coupled to the lower enclosure; the plurality of through holes provided in the circuit board comprises through holes located between the fourth heat dissipation member and the third heat dissipation member; wherein the through holes located between the fourth heat dissipation member and the third heat dissipation member are configured to receive heat conducted by the third heat dissipation member and conduct the heat to the lower enclosure via the fourth heat dissipation member.

11. The optical module according to claim 9, wherein the first heat dissipation member is embedded in the circuit board, with a surface of the first heat dissipation member being exposed on a surface of the circuit board.

12. The optical module according to claim 9, wherein the first heat dissipation member is attached to a surface of the circuit board.

13. The optical module according to claim 9, wherein an intermediate portion of the thermally conductive member is provided with a notch for passing through of a fiber ribbon.

14. The optical module according to claim 13, wherein the thermally conductive member comprises:
 a heat conduction part thermally coupled to the second heat dissipation member, wherein the heat conduction part is configured to receive heat conducted by the second heat dissipation member and to diffuse the heat; and a first thermally conductive column connected to the heat conduction part, wherein a bottom surface of the first thermally conductive column is attached to one end of the second heat dissipation member, and a top surface of the first thermally conductive column is connected to the upper enclosure; wherein the first thermally conductive column is configured to receive heat conducted by the heat conduction part and dissipate the heat via the upper enclosure.

15. The optical module according to claim 14, wherein the thermally conductive member further comprises:

a second thermally conductive column connected to the heat conduction part, wherein a bottom surface of the second thermally conductive column is attached to the other end of the second heat dissipation member, and a top surface of the second thermally conductive column is connected to the upper enclosure; the notch is formed between the first thermally conductive column and the second thermally conductive column; wherein the second thermally conductive column receives heat conducted by the heat conduction part and dissipates the heat via the upper enclosure.

16. The optical module according to claim 9, further comprising:

a thermally conductive adhesive layer provided at both ends of the second heat dissipation member, wherein the thermally conductive adhesive layer is provided between the second heat dissipation member and the thermally conductive member, and is configured to increase heat conduction efficiency.

* * * * *